US012770792B2

(12) United States Patent
Kato et al.

(10) Patent No.: US 12,770,792 B2
(45) Date of Patent: Oct. 20, 2026

(54) ELECTRONIC COMPONENT

(71) Applicant: TDK CORPORATION, Tokyo (JP)

(72) Inventors: Natsumi Kato, Tokyo (JP); Ken Morita, Tokyo (JP); Shinya Onodera, Tokyo (JP); Yuichi Nagai, Tokyo (JP)

(73) Assignee: TDK CORPORATION, Tokyo (JP)

(*) Notice: Subject to any disclaimer, the term of this patent is extended or adjusted under 35 U.S.C. 154(b) by 167 days.

(21) Appl. No.: 18/493,893

(22) Filed: Oct. 25, 2023

(65) Prior Publication Data

US 2024/0212942 A1 Jun. 27, 2024

(30) Foreign Application Priority Data

Dec. 21, 2022 (JP) ................................ 2022-204643

(51) Int. Cl.
*H01G 4/30* (2006.01)
*H01G 4/012* (2006.01)
*H01G 4/232* (2006.01)

(52) U.S. Cl.
CPC ............... *H01G 4/30* (2013.01); *H01G 4/012* (2013.01); *H01G 4/232* (2013.01)

(58) Field of Classification Search
CPC ........ H01G 4/012; H01G 4/232; H01G 4/248; H01G 4/228; H01G 4/2325; H01G 4/30
USPC ..................... 361/306.3, 321.1, 321.3, 301.4
See application file for complete search history.

(56) References Cited

U.S. PATENT DOCUMENTS

2003/0043012 A1* 3/2003 Shiraishi ................ H01C 7/102 338/21
2011/0001399 A1* 1/2011 Oguni ...................... H01C 1/14 310/366
2014/0319974 A1* 10/2014 Feichtinger ............ H01C 1/142 310/365
2016/0027561 A1* 1/2016 Inoue ....................... H01G 4/30 338/20
(Continued)

FOREIGN PATENT DOCUMENTS

JP 2018-006501 A 1/2018
JP 2018-088451 A 6/2018
(Continued)

OTHER PUBLICATIONS

May 19, 2026 Office Action issued in Japanese Application No. P2022-204643.

*Primary Examiner* — Arun Ramaswamy
(74) *Attorney, Agent, or Firm* — Oliff PLC

(57) ABSTRACT

An electronic component includes an element body, a plurality of internal conductors in the element body, and a plurality of external electrodes on the element body, and an electrical insulator on the element body. The element body includes a main surface and a pair of end surfaces. The plurality of internal conductors are exposed to a corresponding end surface of the pair of end surfaces. The plurality of external electrodes are connected to a corresponding internal conductor of the plurality of internal conductors. The plurality of internal conductors are exposed from the electrical insulator at the corresponding end surface. Each of the plurality of external electrodes includes a conductive resin layer. The electrical insulator includes an electrical insulating portion located at least on a region included in the main surface, the region being between the plurality of external electrodes.

19 Claims, 18 Drawing Sheets

(56) References Cited

U.S. PATENT DOCUMENTS

| | | | | |
|---|---|---|---|---|
| 2016/0172110 | A1* | 6/2016 | Otani | H10N 30/063 361/301.4 |
| 2018/0337001 | A1* | 11/2018 | Tozawa | H01F 27/29 |
| 2019/0098761 | A1* | 3/2019 | Yoshida | H01C 7/008 |
| 2019/0131072 | A1* | 5/2019 | Onodera | H01G 4/012 |
| 2019/0385795 | A1* | 12/2019 | Yang | H01G 4/30 |
| 2022/0172895 | A1* | 6/2022 | Lee | H01G 4/012 |
| 2022/0293347 | A1* | 9/2022 | Kim | H01G 4/2325 |

FOREIGN PATENT DOCUMENTS

| | | | |
|---|---|---|---|
| JP | 2020-188144 | A | 11/2020 |
| JP | 2021-136323 | A | 9/2021 |
| JP | 2022-104173 | A | 7/2022 |

* cited by examiner

ELECTRONIC COMPONENT

CROSS-REFERENCE TO RELATED APPLICATIONS

This application is based upon and claims the benefit of priority from Japanese Patent Application No. 2022-204643, filed on Dec. 21, 2022. The entire contents of which are incorporated herein by reference.

BACKGROUND

Field

The present disclosure relates to an electronic component.

Description of the Related Art

Known electronic components include an element body, a plurality of internal conductors in the element body, and a plurality of external electrodes on the element body (see, for example, Japanese Unexamined Patent Publication No. 2018-006501). Each of the plurality of internal conductors is connected to a corresponding external electrode of the plurality of external electrodes. Each of the plurality of external electrodes includes a conductive resin layer.

SUMMARY

The conductive resin layer generally includes a plurality of metal particles and a resin. In a configuration in which the external electrode includes the conductive resin layer, migration may occur in the external electrode. Migration is considered to occur due to the following events, for example.

An electric field acts on the metal particle included in the conductive resin layer, and the metal particle is ionized. Generated metal ion is attracted by an electric field between the external electrodes and migrates from the conductive resin layer. The electric field acting on the metal particle includes, for example, an electric field between the external electrodes or an electric field between the external electrode and an internal conductor in the element body. The metal ion migrating from the conductive resin layer react with, for example, an electron supplied from the internal conductor or the external electrode, and is deposited as metal on a surface of the element body.

One aspect of the present disclosure provides an electronic component reducing occurrence of migration and deterioration of connectivity between an internal conductor and an external electrode.

An electronic component according to one aspect of the present disclosure includes an element body, a plurality of internal conductors in the element body, a plurality of external electrodes on the element body, and an electrical insulator on the element body. The element body includes a main surface arranged to include a mounting surface, and a pair of end surfaces opposing each other and adjacent to the main surface. The plurality of internal conductors are exposed to a corresponding end surface of the pair of end surfaces. The plurality of external electrodes are connected to a corresponding internal conductor of the plurality of internal conductors. The plurality of internal conductors are exposed from the electrical insulator at the corresponding end surface. Each of the plurality of external electrodes includes a conductive resin layer. The electrical insulator includes an electrical insulating portion located at least on a region included in the main surface, the region being between the plurality of external electrodes.

In the one aspect described above, the electrical insulating portion is located at least on the region included in the main surface, the region being between the plurality of external electrodes. Therefore, even when a metal particle included in the conductive resin layer is ionized, the electrical insulating portion prevents the generated metal ion from reacting with an electron supplied from the internal conductor or the external electrode. The electron tends not to be supplied to the metal ion. The metal tends not to deposit on the main surface. Consequently, the one aspect described above reduces occurrence of migration.

The electrical insulator on the element body may impede connection between the internal conductor and the external electrode. In the one aspect described above, the plurality of internal conductors are exposed from the electrical insulator at the corresponding end surface. Therefore, the electrical insulator on the element body tends not to impede the connection between the internal conductor and the external electrode. Consequently, the one aspect described above reduces deterioration of connectivity between the internal conductor and the external electrode.

In the one aspect described above, the element body may include a side surface adjacent to the main surface and the pair of end surfaces. The electrical insulating portion may be located on a ridge region included a ridge portion between the main surface and the side surface, the ridge region being between the plurality of external electrodes.

In a configuration in which the electrical insulating portion is located on the ridge region, the metal tends not to deposit not only on the main surface but also on the ridge portion. Therefore, this configuration further reduces the occurrence of the migration.

In the one aspect described above, each of the plurality of internal conductors may be disposed to extend in a direction intersecting the main surface and may include an end exposed to the corresponding end surface. The end each included in the plurality of internal conductors may include a region exposed from the electrical insulator.

In a configuration in which each of the plurality of internal conductors are disposed as described above and the end each included in the plurality of internal conductors include the region exposed from the electrical insulator, all of the plurality of internal conductors are reliably connected to a corresponding external electrode of the plurality of external electrodes. Therefore, this configuration reliably reduces the deterioration of the connectivity between the internal conductor and the external electrode.

In the one aspect described above, the element body may include a side surface adjacent to the main surface and the pair of end surfaces. The electrical insulating portion may be located on a side region included in the side surface, the side region being between the plurality of external electrodes.

In a configuration in which the electrical insulating portion is located on the side region, the metal tends not to deposit not only on the main surface but also on the side surface. Therefore, this configuration further reduces the occurrence of the migration.

In the one aspect described above, the element body may include a side surface adjacent to the main surface and the pair of end surfaces. The conductive resin layer may include a layer portion on the side surface. The plurality of internal conductors may include an outermost internal conductor that is adjacent to the side surface and has a polarity different from that of the layer portion. The layer portion and the outermost internal conductor may indirectly oppose each other with the electrical insulating portion interposed therebetween.

In a configuration in which the conductive resin layer includes the layer portion on the side surface and the plurality of internal conductors include the outermost internal conductor, a metal particle included in the layer portion on the side surface may be ionized. However, in a configuration in which the layer portion and the outermost internal conductor indirectly oppose each other with the electrical insulating portion interposed therebetween, the electrical insulating portion reliably prevents the metal ion generated from the metal particle included in the layer portion on the side surface from reacting with the electron supplied from the internal conductor or the external electrode. Therefore, the configuration in which the layer portion on the side surface and the outermost internal conductor indirectly oppose each other as described above reliably reduces the occurrence of the migration.

In the one aspect described above, the element body may include a side surface adjacent to the main surface and the pair of end surfaces. The conductive resin layer may include a layer portion on the side surface. The plurality of internal conductors may include a dummy conductor that is adjacent to the side surface and has the same polarity as that of the layer portion. The layer portion and the dummy conductor may oppose each other.

In a configuration in which the conductive resin layer includes the layer portion on the side surface and the plurality of internal conductors include an internal conductor adjacent to the side surface and having a polarity different from that of the layer portion on the side surface, a metal particle included in the layer portion on the side surface may be ionized. However, in a configuration in which the layer portion on the side surface and the dummy conductor oppose each other, the layer portion on the side surface tends not to oppose the internal conductor having the polarity different from that of the layer portion on the side surface. Therefore, the metal particle included in the layer portion on the side surface tends not to be ionized. Consequently, the configuration in which the layer portion on the side surface and the dummy conductor oppose each other reliably reduces the occurrence of the migration.

In the one aspect described above, the element body may include a side surface adjacent to the main surface and the pair of end surfaces. The conductive resin layer may continuously cover a part of the main surface, a part of the corresponding end surface, and a part of the side surface.

A configuration in which the conductive resin layer continuously covers a part of the main surface, a part of the corresponding end surface, and a part of the side surface tends to lead to a decrease in the amount of conductive resin paste used to form the conductive resin layer, as compared with a configuration in which the conductive resin layer continuously covers a part of the main surface, the entire corresponding end surface, and a part of the side surface. The decrease in the amount of the conductive resin paste tends to lead to a decrease in a length of a layer included in the conductive resin layer and located on the main surface in a direction in which the pair of end surfaces oppose each other and an increase in a distance between the plurality of external electrodes on the main surface. The increase in the distance between the plurality of external electrodes reduces an electric field between the plurality of external electrodes. Therefore, the generated metal ion tends not to migrate from the conductive resin layer. Consequently, the configuration in which the conductive resin layer continuously covers a part of the main surface, a part of the corresponding end surface, and a part of the side surface can further reduces the occurrence of the migration.

In the one aspect described above, a height of the electrical insulator in a direction orthogonal to the main surface may be larger than a height of the conductive resin layer in the direction orthogonal to the main surface.

A configuration in which the electrical insulator has the above-described height reliably reduces the occurrence of the migration.

In the one aspect described above, the electrical insulator may include only the electrical insulating portion. The electrical insulating portion may be located only on the main surface.

A configuration in which the electrical insulator includes only the electrical insulating portion and the electrical insulating portion is located only on the main surface reliably reduces the deterioration of the connectivity between the internal conductor and the external electrode.

In the one aspect described above, the electrical insulator may be located between the element body and the conductive resin layer.

A configuration in which the electrical insulator is located between the element body and the conductive resin layer reliably prevents the electron from being supplied to the metal ion. Therefore, this configuration reliably reduces the occurrence of the migration.

In the one aspect described above, the electrical insulator may include an electrical insulating thin film.

In the one aspect described above, the electrical insulator may include a silicon oxide film.

The silicon oxide film has high electrical insulating properties. Therefore, a configuration in which the electrical insulator includes the silicon oxide film reliably reduces the occurrence of the migration.

In the one aspect described above, the conductive resin layer may include a plurality of silver particles.

DETAILED DESCRIPTION

In the following description, with reference to the drawings, the same reference numbers are assigned to the same components or to similar components having the same function, and overlapping description is omitted.

First Example

Figure 1:
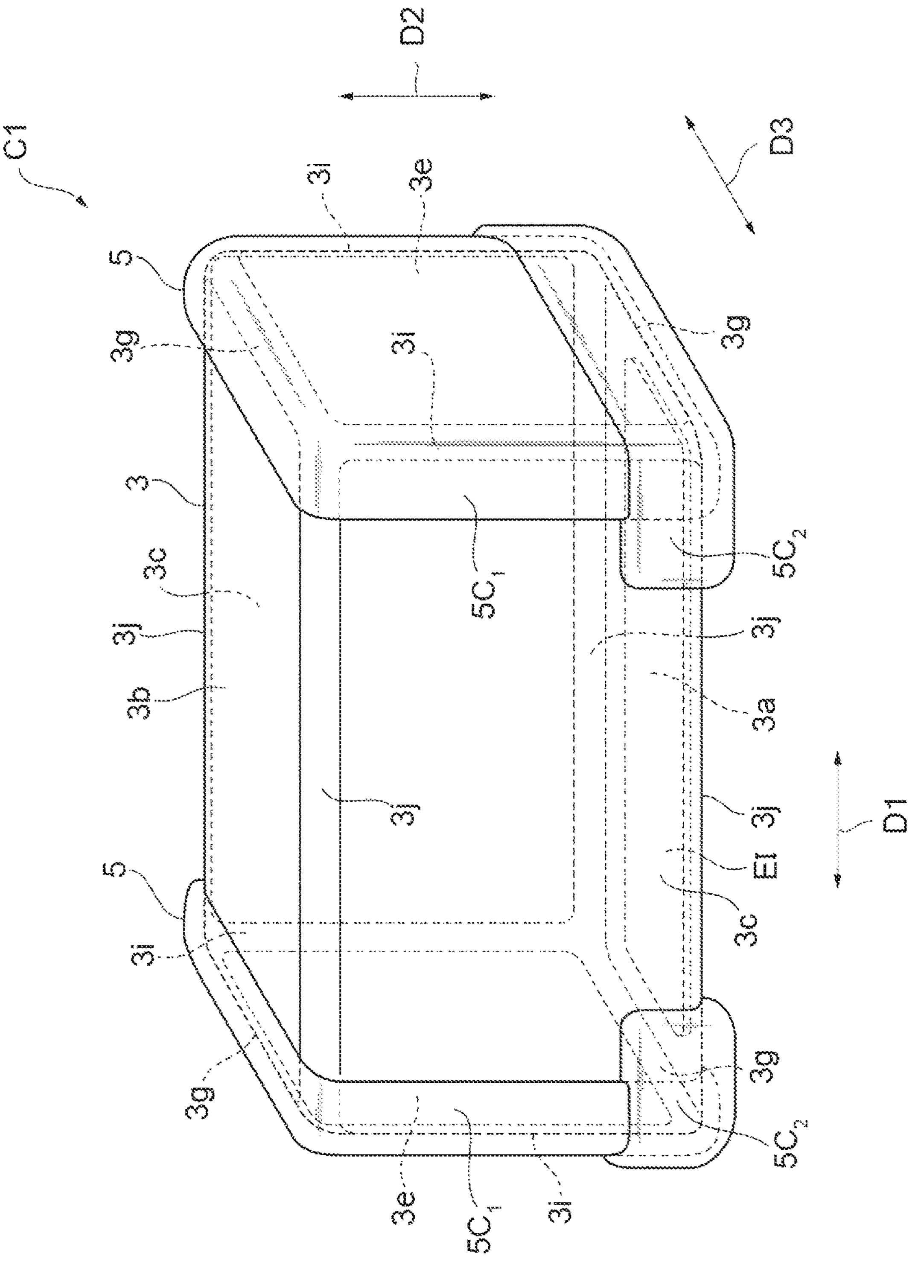
FIG. 1 is a perspective view of a multilayer capacitor according to a first example.

A configuration of a multilayer capacitor C1 according to the first example will be described with reference to FIGS. 1 to 5. FIG. 1 is a perspective view of a multilayer capacitor according to the first example. FIGS. 2, 3, 4, and 5 are views illustrating a cross-sectional configuration of the multilayer capacitor according to the first example.

In the first example, an electronic component includes, for example, the multilayer capacitor C1.

As illustrated in FIG. 1, the multilayer capacitor C1 includes an element body 3 of a rectangular parallelepiped shape, a plurality of external electrodes 5, and an electrical insulating film EI. For example, the multilayer capacitor C1 includes a pair of external electrodes 5. The pair of external electrodes 5 are disposed on an outer surface of the element body 3. The pair of external electrodes 5 are separated from each other. The rectangular parallelepiped shape includes a rectangular parallelepiped shape in which corners and ridges are chamfered, or a rectangular parallelepiped shape in which the corners and ridges are rounded.

The element body 3 includes a pair of main surfaces 3*a* and 3*b* opposing each other, a pair of side surfaces 3*c* opposing each other, and a pair of end surfaces 3*e* opposing each other. The pair of main surfaces 3*a* and 3*b*, the pair of side surfaces 3*c*, and the pair of end surfaces 3*e* each have a substantially rectangular shape. The pair of main surfaces 3*a* and 3*b* oppose each other in a second direction D2. The pair of side surfaces 3*c* oppose each other in a third direction D3. The pair of end surfaces 3*e* oppose each other in a first direction D1. A direction in which the pair of end surfaces 3*e* oppose each other includes the first direction D1. The multilayer capacitor C1 is solder-mounted on an electronic device. The electronic device includes, for example, a circuit board or an electronic component. In the multilayer capacitor C1, the main surface 3*a* opposes the electronic device. The main surface 3*a* is arranged to constitute a mounting surface. The main surface 3*a* is the mounting surface.

The second direction D2 includes a direction orthogonal to the main surfaces 3*a* and 3*b*, and is orthogonal to the third direction D3. The second direction D2 includes a direction intersecting the main surfaces 3*a* and 3*b*. The first direction D1 includes a direction parallel to the main surfaces 3*a* and 3*b* and the side surfaces 3*c*, and is orthogonal to the second direction D2 and the third direction D3. The third direction D3 is a direction orthogonal to the side surfaces 3*c*, and the first direction D1 includes a direction orthogonal to the end surfaces 3*e*. For example, a length of the element body 3 in the first direction D1 is larger than a length of the element body 3 in the second direction D2 and larger than a length of the element body 3 in the third direction D3. The first direction D1 includes a longitudinal direction of the element body 3. The length of the element body 3 in the second direction D2 and the length of the element body 3 in the third direction D3 may be equal to each other. The length of the element body 3 in the second direction D2 and the length of the element body 3 in the third direction D3 may be different.

The length of the element body 3 in the second direction D2 is a height of the element body 3. The length of the element body 3 in the third direction D3 is a width of the element body 3. The length of the element body 3 in the first direction D1 is a length of the element body 3. For example, the height of the element body 3 is 0.1 to 2.5 mm, the width of the element body 3 is 0.1 to 5.0 mm, and the length of the element body 3 is 0.2 to 5.7 mm. For example, the height of the element body 3 is 2.5 mm, the width of the element body 3 is 2.5 mm, and the length of the element body 3 is 3.2 mm.

The pair of side surfaces 3*c* extend in the second direction D2 to couple the pair of main surfaces 3*a* and 3*b* to each other. The pair of side surfaces 3*c* also extend in the first direction D1. The pair of end surfaces 3*e* extend in the second direction D2 to couple the pair of main surfaces 3*a* and 3*b* to each other. The pair of end surfaces 3*e* also extend in the third direction D3.

The element body 3 includes four ridge portions 3*g*, four ridge portions 3*i*, and four ridge portions 3*j*. The ridge portions 3*g* are located between the end surfaces 3*e* and the main surfaces 3*a* and 3*b*. The ridge portions 3*i* are located between the end surfaces 3*e* and the side surfaces 3*c*. The ridge portions 3*j* are located between the main surfaces 3*a* and 3*b* and the side surfaces 3*c*. For example, the ridge portions 3*g*, 3*i*, and 3*j* are rounded to be curved. For example, the element body 3 is subjected to what is called a round chamfering process. The end surfaces 3*e* and the main surfaces 3*a* and 3*b* are indirectly adjacent to each other with the ridge portion 3*g* interposed therebetween. The end surfaces 3*e* and the side surfaces 3*c* are indirectly adjacent to each other with the ridge portion 3*i* interposed therebetween. The main surfaces 3*a* and 3*b* and the side surfaces 3*c* are indirectly adjacent to each other with the ridge portion 3*j* interposed therebetween.

The element body 3 is configured through laminating a plurality of dielectric layers in the third direction D3. The element body 3 includes a plurality of laminated dielectric layers. In the element body 3, a lamination direction of the plurality of dielectric layers coincides with the third direction D3. Each dielectric layer includes, for example, a sintered body of a ceramic green sheet containing a dielectric material. Examples of the dielectric material include dielectric ceramics. Examples of the dielectric ceramics include $BaTiO_3$-based, $Ba(Ti, Zr)O_3$-based, or $(Ba, Ca)TiO_3$-based dielectric ceramics. In the actual element body 3, each of the dielectric layers is integrated to such an extent that a boundary between the dielectric layers cannot be visually recognized.

Figure 2:
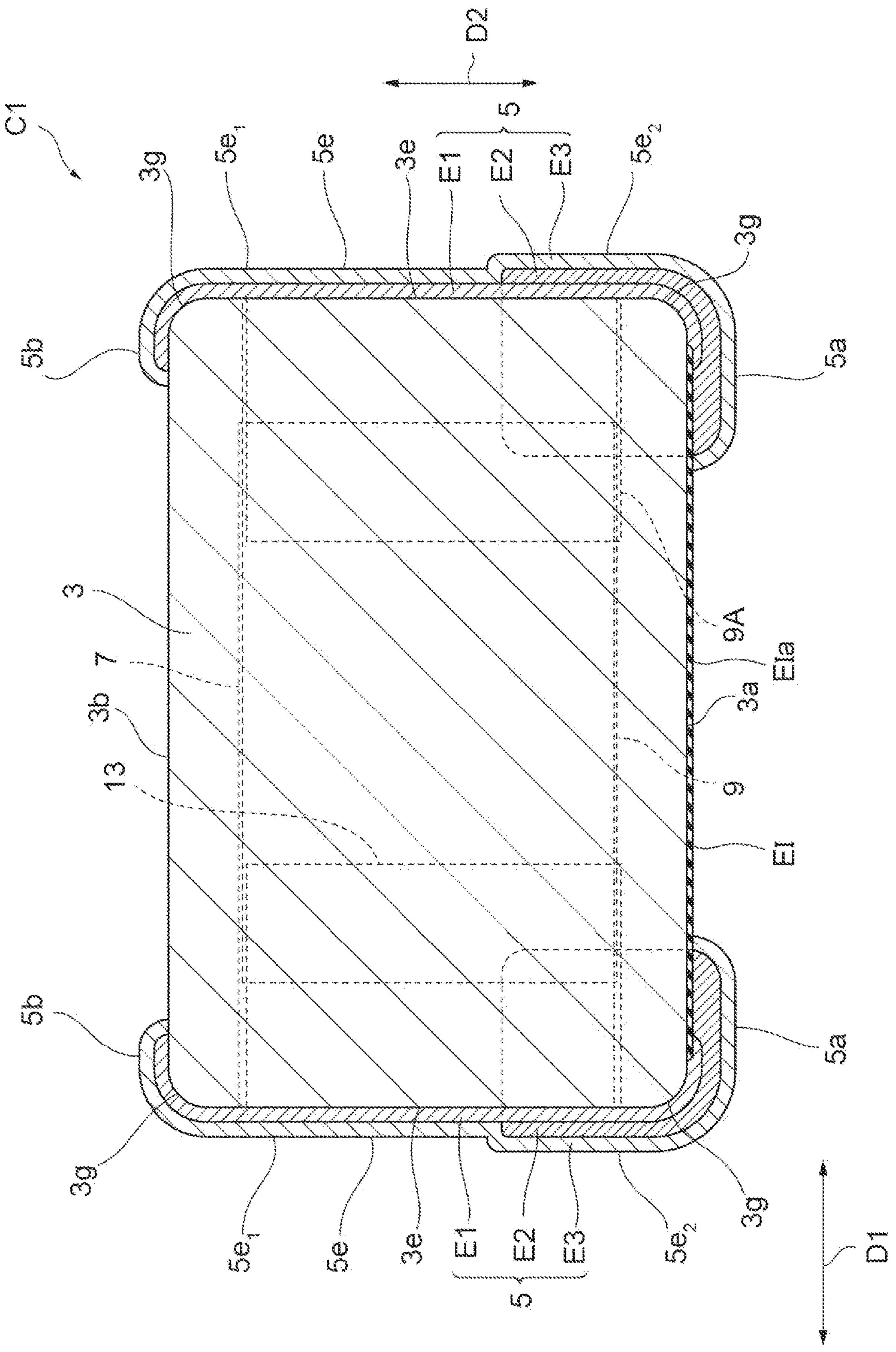
FIG. 2 is a view illustrating a cross-sectional configuration of the multilayer capacitor according to the first example.
Figure 3:
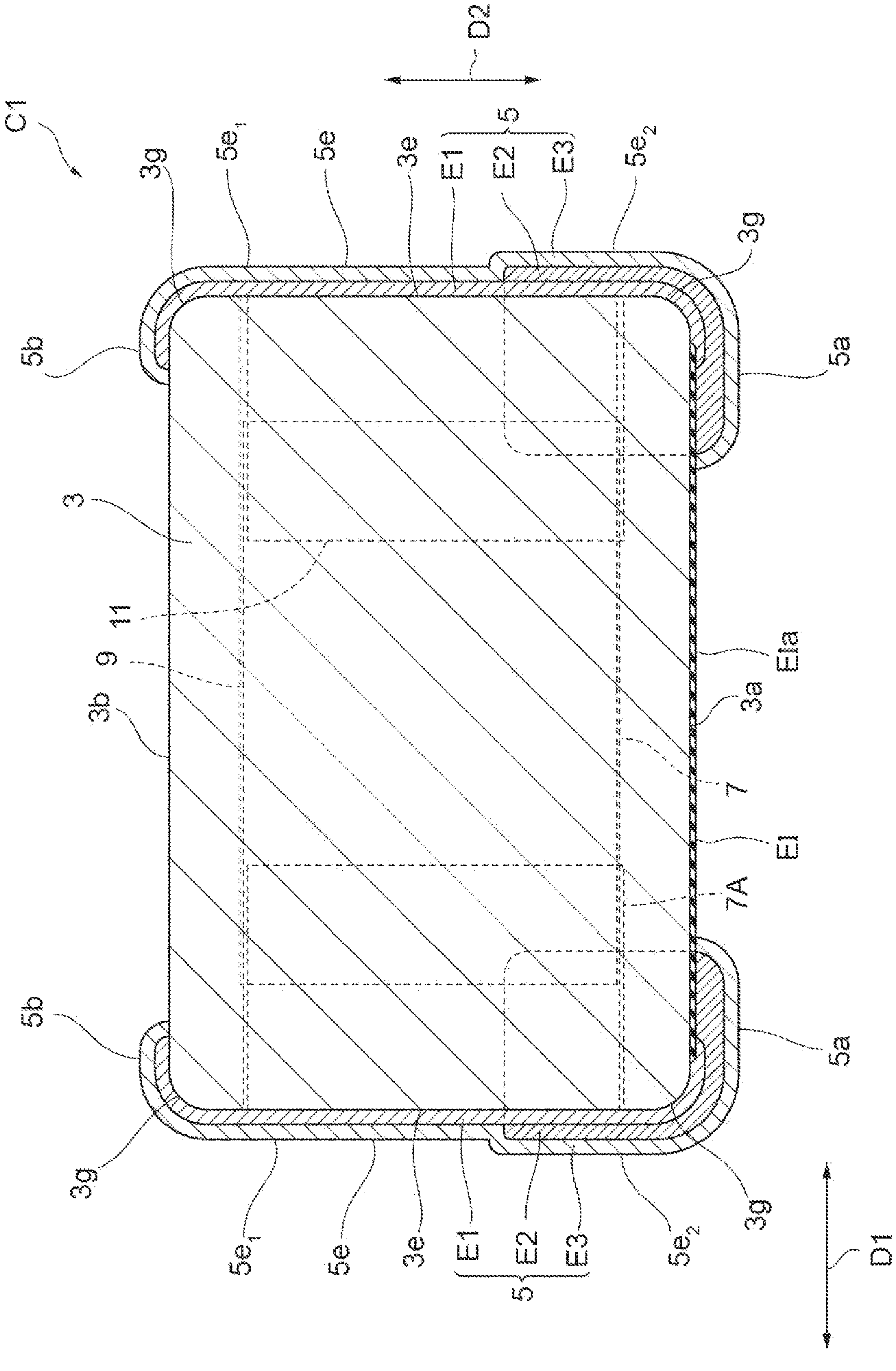
FIG. 3 is a view illustrating a cross-sectional configuration of the multilayer capacitor according to the first example.
Figure 5:
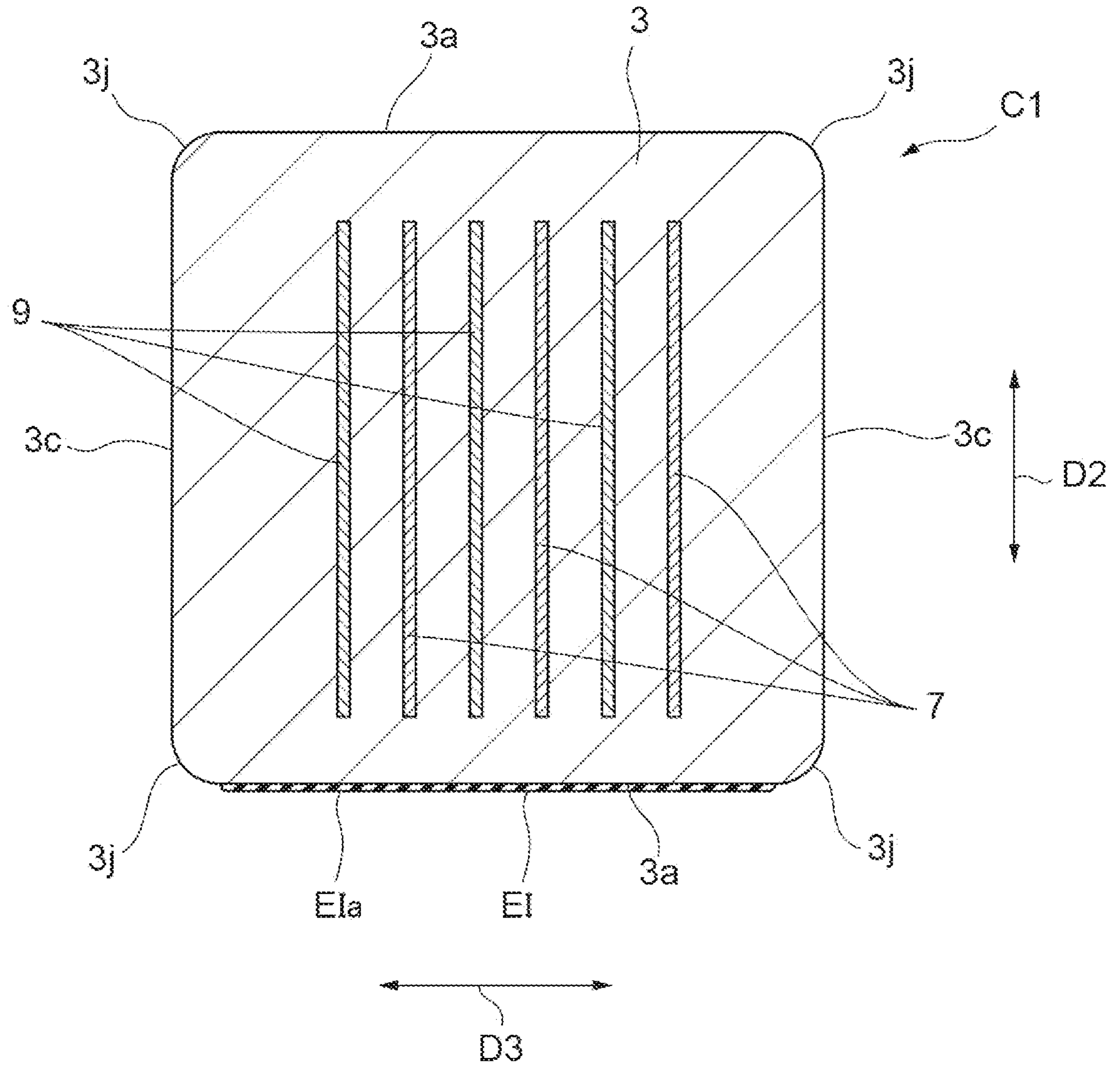
FIG. 5 is a view illustrating a cross-sectional configuration of the multilayer capacitor according to the first example.

The electrical insulating film EI is disposed on the element body 3 as illustrated in FIGS. 2, 3, and 5. The electrical insulating film EI is directly disposed on the element body 3. The electrical insulating film EI includes a film portion EIa. For example, the electrical insulating film EI includes only the film portion EIa. The film portion EIa is disposed on the main surface 3*a*. The film portion EIa covers the main surface 3*a* and is in direct contact with the main surface 3*a*. The film portion EIa is located only on the main surface 3*a*. The side surfaces 3*c*, the end surfaces 3*e*, and the ridge portion 3*g*, 3*i*, and 3*j* are exposed from the electrical insulating film EI. The electrical insulating film EI may include an electrical insulator. The film portion EIa may include an electrical insulating portion.

The electrical insulating film EI has, for example, an electrical resistivity higher than an electrical resistivity of the element body 3. The electrical resistivity of the element body 3 includes a volume resistivity of the element body 3 or a surface resistivity of the element body 3. The electrical insulating film EI may have an electrical resistivity higher than the volume resistivity of the element body 3 and higher than the surface resistivity of the element body 3.

The electrical insulating film EI includes, for example, an electrical insulating thin film. In this case, the electrical insulating film EI may include a sputtered film. The electrical insulating film EI includes, for example, a silicon oxide film. The silicon oxide film includes, for example, a silicon dioxide film. The electrical insulating film EI may include, for example, an aluminum oxide film.

An average thickness of the film portion EIa is, for example, 0.02 μm or more. The average thickness may be 0.05 μm or more.

The average thickness can be obtained, for example, as follows.

A cross-sectional photograph of the electrical insulating film EI including the film portion EIa is acquired. The cross-sectional photograph is a photograph of a cross section when the multilayer capacitor C1 is cut along a plane perpendicular to the main surface 3*a*. The cross-sectional photograph is, for example, a photograph of a cross section of the multilayer capacitor C1 when cut in a plane parallel to the pair of side surfaces 3*c* and equidistant from the pair of side surfaces 3*c*. The acquired cross-sectional photograph is image-processed by software. By this image processing, a boundary of the electrical insulating film EI (film portion EIa) is determined. An area of the film portion EIa on the acquired cross-sectional photograph is calculated.

The area of the film portion EIa is divided by a length of the film portion EIa on the acquired cross-sectional photograph, and the obtained quotient is set as the average thickness.

As illustrated in FIGS. 2 to 5, the multilayer capacitor C1 includes a plurality of internal electrodes 7 and a plurality of internal electrodes 9. Each of the internal electrodes 7 and 9 includes an internal conductor disposed in the element body 3. Each of the internal electrodes 7 and 9 is made of an electrically conductive material that is commonly used as an internal conductor of a multilayer electronic component. The electrically conductive material includes, for example, a base metal. The electrically conductive material includes, for example, Ni or Cu. Each of the internal electrodes 7 and 9 is configured as a sintered body of electrically conductive paste containing the electrically conductive material described above. For example, the internal electrodes 7 and 9 are made of Ni.

The internal electrodes 7 and the internal electrodes 9 are disposed in different positions (layers) in the third direction D3. The internal electrodes 7 and the internal electrodes 9 are alternately disposed in the element body 3 to oppose each other in the third direction D3 with an interval therebetween. The internal electrodes 7 and the internal electrodes 9 have different polarities from each other. One end of each of the internal electrodes 7 and 9 is exposed to a corresponding end surface 3*e* of the pair of end surfaces 3*e*. Each of the internal electrodes 7 and 9 includes the one end exposed to the corresponding end surface 3*e*.

As described above, each of the end surfaces 3*e* is exposed from the electrical insulating film EI (film portion EIa). The one end included in each of the plurality of internal electrodes 7 and 9 includes a region exposed from the electrical insulating film EI. For example, the one end included in each of the plurality of internal electrodes 7 and 9 includes only the region exposed from the electrical insulating film EI. The entire one end included in each of the plurality of internal electrodes 7 and 9 is exposed from the electrical insulating film EI.

The plurality of internal electrodes 7 and the plurality of internal electrodes 9 are alternately disposed in the third direction D3. The plurality of internal electrodes 7 and the plurality of internal electrodes 9 are disposed in the element body 3 to be distributed in the third direction D3. Each of the plurality of internal electrodes 7 and the plurality of internal electrodes 9 is located in a plane substantially parallel to the side surfaces 3*c*. Each of the plurality of internal electrodes 7 and the plurality of internal electrodes 9 is disposed to extend in a direction intersecting the main surface 3*a*. For example, each of the plurality of internal electrodes 7 and the plurality of internal electrodes 9 is disposed to extend in a direction substantially orthogonal to the main surface 3*a*. The internal electrode 7 and the internal electrode 9 oppose each other in the third direction D3. The direction in which the internal electrode 7 and the internal electrode 9 oppose each other, that is, the third direction D3 is orthogonal to a direction parallel to the side surfaces 3*c* (second direction D2 and first direction D1).

For example, the plurality of internal electrodes 7 include one internal electrode 7A located on the outermost side in the third direction D3. The internal electrode 7A is adjacent to one side surface 3*c* of the pair of side surface 3*c* in the third direction D3. The internal electrode 7A is closest to the one side surface 3*c* among the plurality of internal electrodes 7. The internal electrode 7A includes an outermost internal electrode.

For example, the plurality of internal electrodes 9 include one internal electrode 9A located on the outermost side in the third direction D3. The internal electrode 9A includes an outermost internal electrode. The one internal electrode 9A is adjacent to another side surface 3*c* of the pair of side surface 3*c* in the third direction D3. The internal electrode 9A is closest to the other side surface 3*c* among the plurality of internal electrodes 9.

As illustrated in FIGS. 1 to 4, the external electrodes 5 are disposed on the element body 3. For example, the external electrodes 5 are disposed on the element body 3 and the electrical insulating film EI. The external electrodes 5 include a portion disposed directly on the electrical insulating film EI and a portion disposed directly on the element body 3. The portion disposed directly on the electrical insulating film EI is disposed indirectly on the element body 3.

Figure 4:
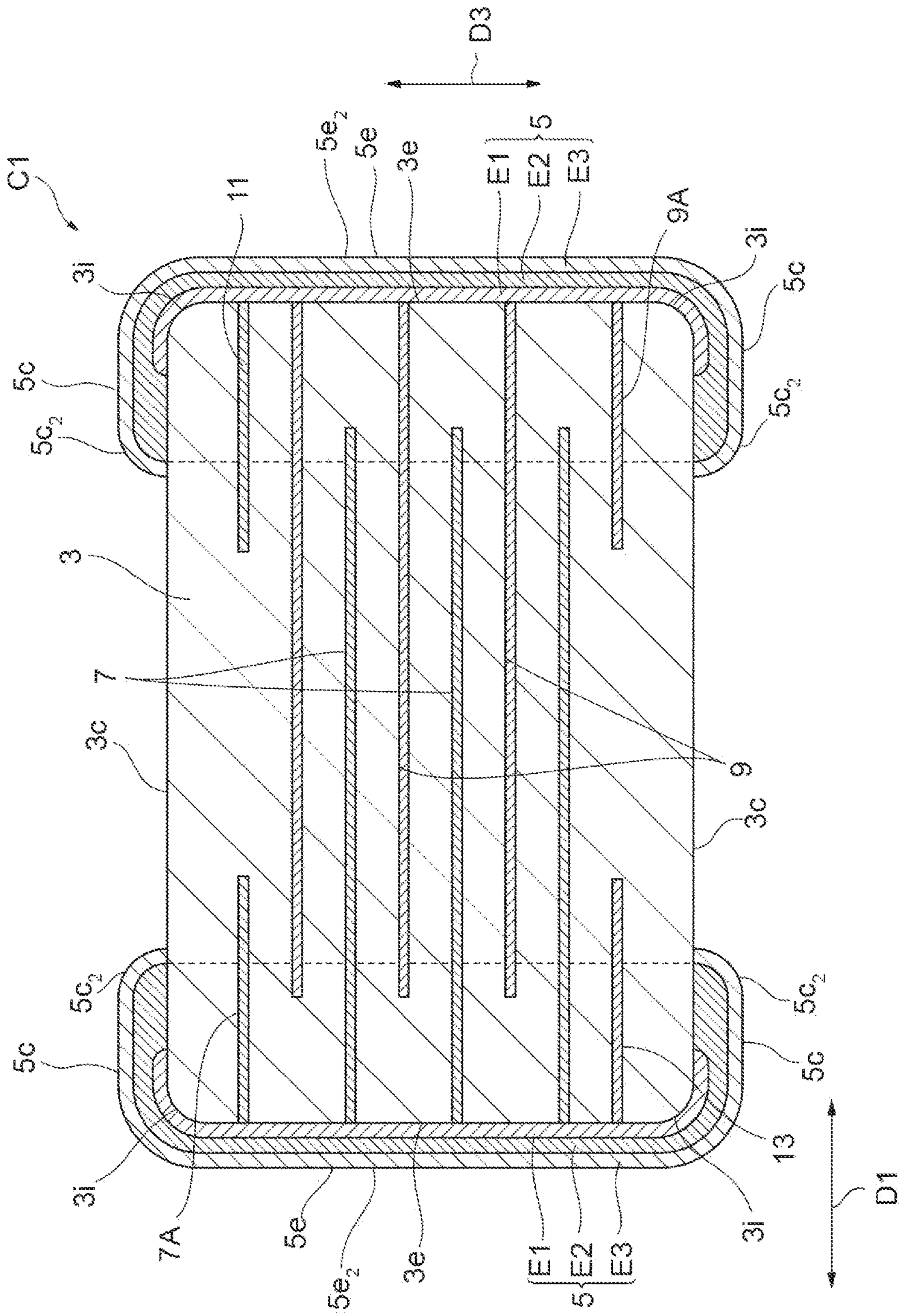
FIG. 4 is a view illustrating a cross-sectional configuration of the multilayer capacitor according to the first example.

The external electrodes 5 are disposed at both ends of the element body 3 in the first direction D1. Each external electrode 5 is disposed on the corresponding end surface 3*e* of the element body 3. For example, each external electrode 5 is disposed on the pair of main surfaces 3*a* and 3*b*, the pair of side surfaces 3*c*, and the end surface 3*e*. The external electrode 5 includes a plurality of electrode portions 5*a*, 5*b*, 5*c*, and 5*e* as illustrated in FIGS. 2 to 4. The electrode portion 5*a* is disposed on the main surface 3*a* and on the ridge portion 3*g*. The electrode portion 5*b* is disposed on the main surface 3*b* and on the ridge portion 3*g*. Each electrode portion 5*c* is disposed on the side surface 3*c* and on the ridge portion 3*i*. The electrode portion 5*e* is disposed on the end surface 3*e*. The external electrode 5 also includes an electrode portion disposed on the ridge portion 3*j*.

Each external electrode 5 is formed on the four surfaces of the main surface 3*b*, the pair of side surfaces 3*c*, and the end surface 3*e* and the ridge portions 3*g*, 3*i*, and 3*j* as well as the electrical insulating film EI. Each external electrode 5 is indirectly formed on the main surface 3*a*. The electrode portions 5*a*, 5*b*, 5*c*, and 5*e* adjacent to each other are coupled and are electrically connected to each other. The electrode portion 5*e* covers all the one ends of corresponding internal electrodes of the plurality of internal electrodes 7 and 9. The electrode portion 5*e* is directly connected to the corresponding internal electrodes of the plurality of internal electrodes 7 and 9. The external electrode 5 is electrically connected to the corresponding internal electrodes of the plurality of internal electrodes 7 and 9. As illustrated in FIGS. 2 to 4, the external electrode 5 includes a first electrode layer E1, a second electrode layer E2, and a third electrode layer E3. The third electrode layer E3 is arranged to include the outermost layer of the external electrode 5. Each of the electrode portions 5*a*, 5*c*, and 5*e* includes the first electrode layer E1, the second electrode layer E2, and the third electrode layer E3. The electrode portion 5*b* includes the first electrode layer E1 and the third electrode layer E3.

The first electrode layer E1 of the electrode portion 5*a* is disposed on the electrical insulating film EI and on the ridge portion 3*g*. The first electrode layer E1 of the electrode portion 5*a* is formed on the electrical insulating film EI to cover a part of the electrical insulating film EI and is formed on the element body 3 to cover the entire ridge portion 3*g*. The first electrode layer E1 of the electrode portion 5*a* is in contact with the above-described part of the electrical insulating film EI and the entire ridge portion 3*g*. The first electrode layer E1 of the electrode portion 5*a* is formed on the element body 3 to cover a part of the ridge portion 3*j*. The first electrode layer E1 of the electrode portion 5*a* is in contact with the above-described part of the ridge portion 3*j*. In the electrode portion 5*a*, the first electrode layer E1 is in direct contact with the electrical insulating film EI (film portion EIa) and is in direct contact with the element body 3. The electrical insulating film EI is indirectly covered with the first electrode layer E1 at the above-described part, and is exposed from the first electrode layer E1 at the remaining part excluding the above-described part. The above-described part of the electrical insulating film EI includes a partial region, of the electrical insulating film EI, closer to the end surface 3*e*. The first electrode layer E1 of the electrode portion 5*a* is located on the electrical insulating film EI. The main surface 3*a* includes a portion indirectly covered with the first electrode layer E1 and a portion exposed from the first electrode layer E1. The first electrode layer E1 may not be formed on the electrical insulating film EI. The first electrode layer E1 may not be disposed on the electrical insulating film EI.

The second electrode layer E2 of the electrode portion 5*a* is disposed on the first electrode layer E1 and on the electrical insulating film EI. In the electrode portion 5*a*, the second electrode layer E2 is formed on the first electrode layer E1 to cover the first electrode layer E1, and is formed on the electrical insulating film EI to cover a part of the electrical insulating film EI. The second electrode layer E2 of the electrode portion 5*a* is contact with the above-described part of the electrical insulating film EI and the entire first electrode layer E1. In the electrode portion 5*a*, the second electrode layer E2 is in direct contact with the first electrode layer E1 and the electrical insulating film EI (film portion EIa). In the electrode portion 5*a*, the second electrode layer E2 indirectly covers the main surface 3*a* so that the first electrode layer E1 and electrical insulating film EI are located between the second electrode layer E2 and the main surface 3*a*. The second electrode layer E2 of the electrode portion 5*a* is located on the main surface 3*a*. A portion included in the second electrode layer E2 and located on the main surface 3*a* includes a layer portion located on the main surface 3*a*. The second electrode layer E2 includes the layer portion located on the main surface 3*a*.

The third electrode layer E3 of the electrode portion 5*a* is disposed on the second electrode layer E2. In the electrode portion 5*a*, the third electrode layer E3 covers the second electrode layer E2. In the electrode portion 5*a*, the third electrode layer E3 is in contact with the entire second electrode layer E2. In the electrode portion 5*a*, the third electrode layer E3 is in direct contact with the second electrode layer E2. In the electrode portion 5*a*, the third electrode layer E3 is not in direct contact with the first electrode layer E1. The third electrode layer E3 of the electrode portion 5*a* is located on the main surface 3*a*.

The first electrode layer E1 of the electrode portion 5*b* is disposed on the main surface 3*b* and on the ridge portion 3*g*. The first electrode layer E1 of the electrode portion 5*b* covers a part of the main surface 3*b* and the entire ridge portion 3*g*. The first electrode layer E1 of the electrode portion 5*b* is in contact with the above-described part of the main surface 3*b* and the entire ridge portion 3*g*. In the electrode portion 5*a*, the first electrode layer E1 is in direct contact with the element body 3. The main surface 3*b* is covered with the first electrode layer E1 at the above-described part, and is exposed from the first electrode layer E1 at the remaining part excluding the above-described part. The above-described part of the main surface 3*b* includes a partial region, of the main surface 3*b*, closer to the end surface 3*e*. The first electrode layer E1 of the electrode portion 5*b* is located on the main surface 3*b*. The first electrode layer E1 may not be formed on the main surface 3*b*. The first electrode layer E1 may not be disposed on the main surface 3*b*.

The third electrode layer E3 of the electrode portion 5*b* is disposed on the first electrode layer E1. In the electrode portion 5*b*, the third electrode layer E3 covers the first electrode layer E1. In the electrode portion 5*b*, the third electrode layer E3 is in contact with the first electrode layer E1. In the electrode portion 5*b*, the third electrode layer E3 is in direct contact with the first electrode layer E1. The third electrode layer E3 of the electrode portion 5*b* is located on the main surface 3*b*. The main surface 3*b* includes no portion covered with the second electrode layer E2.

The first electrode layer E1 of the electrode portion 5*c* is disposed on the side surface 3*c* and on the ridge portion 3*i*.

The first electrode layer E1 of the electrode portion 5*c* covers a part of the side surface 3*c* and the entire ridge portion 3*i*. The first electrode layer E1 of the electrode portion 5*c* is in contact with the above-described part of the side surface 3*c* and on the entire ridge portion 3*i*. In the electrode portion 5*c*, the first electrode layer E1 is in direct contact with the element body 3. The side surface 3*c* is covered with the first electrode layer E1 at the above-described part, and is exposed from the first electrode layer E1 at the remaining part excluding the above-described part. The above-described part of the side surface 3*c* includes a partial region, of the side surface 3*c*, closer to the end surface 3*e*. The first electrode layer E1 of the electrode portion 5*c* is located on the side surface 3*c*. The first electrode layer E1 may not be formed on the side surface 3*c*. The first electrode layer E1 may not be disposed on the side surface 3*c*.

The second electrode layer E2 of the electrode portion 5*c* is disposed on the first electrode layer E1 and on the side surface 3*c*. In the electrode portion 5*c*, the second electrode layer E2 covers a part of the first electrode layer E1 and a part of the side surface 3*c*. In the electrode portion 5*c*, the second electrode layer E2 is in direct contact with the above-described part of the first electrode layer E1 and the above-described part of the side surface 3*c*. The second electrode layer E2 of the electrode portion 5*c* directly covers the above-described part of the first electrode layer E1 of the electrode portion 5*c*. The above-described part of the side surface 3*c* includes, for example, a corner region, of the side surface 3*c*, closer to the main surface 3*a* and the end surface 3*e*. In the electrode portion 5*c*, the second electrode layer E2 indirectly covers the above-described part of the side surface 3*c* so that the first electrode layer E1 is located between the second electrode layer E2 and the side surface 3*c*. The first electrode layer E1 of the electrode portion 5 is covered with the second electrode layer E2 at the above-described part, and is exposed from the second electrode layer E2 at the remaining part excluding the above-described part. The second electrode layer E2 of the electrode portion 5*c* is located on the side surface 3*c*. A portion included in the second layer E2 and located on the side surface 3*c* includes a layer portion located on the side surface 3*c*. The second electrode layer E2 includes the layer portion located on the side surface 3*c*.

The third electrode layer E3 of the electrode portion 5*c* is disposed on the first electrode layer E1 and the second electrode layer E2. In the electrode portion 5*c*, the third electrode layer E3 covers the entire second electrode layer E2 and the entire portion included in the first electrode layer E1 and exposed from the second electrode layer E2. In the electrode portion 5*c*, the third electrode layer E3 is in direct contact with the entire second electrode layer E2 and the entire portion included in the first electrode layer E1 and exposed from the second electrode layer E2. In the electrode portion 5*c*, the third electrode layer E3 is in direct contact with the first electrode layer E1 and the second electrode layer E2. The third electrode layer E3 of the electrode portion 5*c* is located on the side surface 3*c*.

The electrode portion 5*c* includes a plurality of regions $5c_1$ and $5c_2$. For example, the electrode portion 5*c* includes only two regions $5c_1$ and $5c_2$. The region $5c_2$ is positioned closer to the main surface 3*a* than the region $5c_1$. The region $5c_1$ includes the first electrode layer E1 and the third electrode layer E3. The region $5c_1$ does not include the second electrode layer E2. The region $5c_2$ includes the first electrode layer E1, the second electrode layer E2, and the third electrode layer E3. The region $5c_1$ includes a region where the first electrode layer E1 is exposed from the second electrode layer E2. The region $5c_2$ includes a region where the first electrode layer E1 is covered with the second electrode layer E2.

The first electrode layer E1 of the electrode portion 5*e* is disposed on the end surface 3*e*. The first electrode layer E1 of the electrode portion 5*e* covers the entire end surface 3*e*. The first electrode layer E1 of the electrode portion 5*e* is in contact with the entire end surface 3*e*. In the electrode portion 5*e*, the first electrode layer E1 is in direct contact with the end surface 3*e*.

The second electrode layer E2 of the electrode portion 5*e* is disposed on the first electrode layer E1. In the electrode portion 5*e*, the second electrode layer E2 covers a part of the first electrode layer E1. In the electrode portion 5*e*, the second electrode layer E2 is in direct contact with the above-described part of the first electrode layer E1. The second electrode layer E2 of the electrode portion 5*e* directly covers the above-described part of the first electrode layer E1 of the electrode portion 5*e*. In the electrode portion 5*e*, the second electrode layer E2 indirectly covers a part of the end surface 3*e* so that the first electrode layer E1 is located between the second electrode layer E2 and the end surface 3*e*. The above-described part of the end surface 3*e* includes, for example, a partial region, of the end surface 3*e*, closer to the main surface 3*a*. The first electrode layer E1 of the electrode portion 5*e* is covered with the second electrode layer E2 at the above-described part, and is exposed from the second electrode layer E2 at the remaining part excluding the above-described part. The second electrode layer E2 of the electrode portion 5*e* is located on the end surface 3*e*. A portion included in the second layer E2 and located on the end surface 3*e* includes a layer portion located on the end surface 3*e*. The second electrode layer E2 includes the layer portion located on the end surface 3*e*.

The third electrode layer E3 of the electrode portion 5*e* is disposed on the first electrode layer E1 and the second electrode layer E2. In the electrode portion 5*e*, the third electrode layer E3 covers the entire second electrode layer E2 and the entire portion included in the first electrode layer E1 and exposed from the second electrode layer E2. In the electrode portion 5*e*, the third electrode layer E3 is in direct contact with the entire second electrode layer E2 and the entire portion included in the first electrode layer E1 and exposed from the second electrode layer E2. In the electrode portion 5*e*, the third electrode layer E3 is in direct contact with the first electrode layer E1 and the second electrode layer E2. The third electrode layer E3 of the electrode portion 5*e* is located on the end surface 3*e*.

The electrode portion 5*e* may not include the second electrode layer E2. A configuration in which the electrode portion 5*e* does not include the second electrode layer E2, the third electrode layer E3 of the electrode portion 5*e* directly covers the entire first electrode layer E1 and is direct contact with the first electrode layer E1.

The electrode portion 5*e* includes a plurality of regions $5e_1$ and $5e_2$. For example, the electrode portion 5*e* includes only two regions $5e_1$ and $5e_2$. The region $5e_2$ is positioned closer to the main surface 3*a* than the region $5e_1$. The region $5e_1$ includes the first electrode layer E1 and the third electrode layer E3. The region $5e_1$ does not include the second electrode layer E2. The region $5e_2$ includes the first electrode layer E1, the second electrode layer E2, and the third electrode layer E3. In the electrode portion 5*e*, the third electrode layer E3 covers the entire end surface 3*e* when viewed from the first direction D1. For example, the third electrode layer E3 indirectly covers the entire end surface 3*e*. The region $5e_1$ includes a region where the first electrode layer E1 is exposed from the second electrode layer E2. The region $5e_2$ includes a region where the first electrode layer E1 is covered with the second electrode layer E2.

The electrical insulating film EI includes a portion covered with the external electrode 5 and a portion exposed from the external electrode 5. The film portion EIa includes a portion covered with the electrode portion 5*a* and a portion exposed from the electrode portion 5*a*. The portion included in the electrical insulating film EI (film portion EIa) and exposed from the external electrode 5 (electrode portion 5*a*) is located on a region that is included in the main surface 3*a* and is between the plurality of external electrodes 5 (plurality of electrode portions 5*a*). The electrical insulating film EI includes a film portion located at least on a region that is included in the main surface 3*a* and is between the plurality of external electrodes 5. The electrical insulating film EI includes a film portion located at least on a region that is included in the main surface 3*a* and is exposed from the plurality of external electrodes 5.

The first electrode layer E1 is formed from sintering electrically conductive paste applied onto the surface of the element body 3. The first electrode layer E1 covers the above-described part of each of the main surfaces 3*a* and 3*b*, the above-described part of each of the side surfaces 3*c*, the end surface 3*e*, and the ridge portions 3*g*, 3*i*, and 3*j*. The first electrode layer E1 is formed from sintering a metal component included in the electrically conductive paste. The metal component contained in the electrically conductive paste includes, for example, metal particles. The first electrode layer E1 includes a sintered metal layer. For example, the first electrode layer E1 includes a sintered metal layer made of Cu. The first electrode layer E1 may include a sintered metal layer made of Ni. The first electrode layer E1 includes a base metal. The electrically conductive paste includes, for example, particles made of Cu or Ni, a glass component, an organic binder, and an organic solvent. The first electrode layer E1 included in each of the electrode portions 5*a*, 5*b*, 5*c*, and 5*e* is integrally formed.

The second electrode layer E2 is formed from curing electrically conductive resin paste applied onto the first electrode layer E1. The second electrode layer E2 is formed over the first electrode layer E1 and on the element body 3. The first electrode layer E1 includes an underlying metal layer for forming the second electrode layer E2. The second electrode layer E2 includes an electrically conductive resin layer that covers the first electrode layer E1. The conductive resin paste includes, for example, a resin, an electrically conductive material, and an organic solvent. The resin includes, for example, a thermosetting resin. The conductive material includes, for example, metal particles. The metal particles include, for example, silver particles or copper particles. For example, the second electrode layer E2 includes a plurality of silver particles. The thermosetting resin is, for example, a phenol resin, an acrylic resin, a silicone resin, an epoxy resin, or a polyimide resin. The second electrode layer E2 is in contact with a part of the ridge portion 3*j*. The second electrode layer E2 included in each of the electrode portions 5*a*, 5*c*, and 5*e* is integrally formed.

The third electrode layer E3 is formed on the second electrode layer E2 and on the first electrode layer E1 (the portion exposed from the second electrode layer E2) through a plating method. The third electrode layer E3 may have a multilayer structure. In this case, the third electrode layer E3 includes, for example, an Ni plating layer and a solder plating layer. The Ni plating layer is formed on the second electrode layer E2 and on the first electrode layer E1. The solder plating layer is formed on the Ni plating layer. The solder plating layer covers the Ni plating layer. The Ni plating layer has better solder leach resistance than the metal included in the second electrode layer E2. The third electrode layer E3 may include an Sn plating layer, a Cu plating layer, or an Au plating layer instead of the Ni plating layer. The solder plating layer includes, for example, an Sn plating layer, an Sn—Ag alloy plating layer, an Sn—Bi alloy plating layer, or an Sn—Cu alloy plating layer. The third electrode layer E3 included in each of the electrode portions 5*a*, 5*b*, 5*c*, and 5*e* is integrally formed.

In the multilayer capacitor C1, the second electrode layer E2 continuously covers only a part of the main surface 3*a*, only a part of the end surface 3*e*, and only a part of each of the pair of side surfaces 3*c*. The second electrode layer E2 includes a portion continuously covering only a part of the main surface 3*a*, only a part of the end surface 3*e*, and only a part of each of the pair of side surfaces 3*c*. The above-described part of the end surface 3*e* includes a part of the end surface 3*e* closer to the main surface 3*a*. The above-described part of the side surface 3*c* includes a part of the side surface 3*c* closer to the main surface 3*a*. The second electrode layer E2 covers the entire one ridge portion 3*g*, only a part of the ridge portion 3*i*, and only a part of the ridge portion 3*j*. A portion of the first electrode layer E1 covering the ridge portion 3*i* is partially exposed from the second electrode layer E2. For example, the first electrode layer E1 included in the regions $5c_1$ and $5e_1$ is exposed from the second electrode layer E2.

A configuration in which the electrode portion 5*e* does not includes the second electrode layer E2, the second electrode layer E2 continuously covers only a part of the main surface 3*a* and only a part of each of the pair of side surfaces 3*c*. That is, the second electrode layer E2 includes a portion continuously covering only a part of the main surface 3*a* and only a part of each of the pair of side surfaces 3*c*.

The multilayer capacitor C1 includes a plurality of conductors 11 and 13 as illustrated in FIGS. 2 to 4. The plurality of conductors 11 and 13 are disposed in the element body 3. For example, the multilayer capacitor C1 includes two conductors 11 and 13. A plurality of internal conductors included in the multilayer capacitor C1 includes the plurality of internal electrodes 7 and 9 and the plurality of conductors 11 and 13. In FIGS. 2 and 3, for the sake of explanation, the internal electrodes 7 and 9 (internal electrodes 7A and 9A) and the conductors 11 and 13 are intentionally illustrated so as to deviate from each other in the second direction D2.

The conductor 11 is located in the same layer as the internal electrode 7A and is separated from the internal electrode 7A. The conductor 11 includes one end exposed to a corresponding end surface 3*e* of the pair of end surfaces 3*e*. The one end of the conductor 11 is exposed to the end surface 3*e* to which the one end of the internal electrode 9 is exposed. The one end of the conductor 11 is entirely covered by a corresponding electrode portion 5*e* of the plurality of electrode portions 5*e*. The conductor 11 is directly connected to the corresponding electrode portion 5*e*. The conductor 11 is electrically connected to a corresponding external electrode 5 of the pair of external electrodes 5. For example, the conductor 11 is electrically connected to the external electrode 5 (electrode portion 5*e*) to which the internal electrode 9 is electrically connected. The conductor 11 is electrically connected to the external electrode 5 to which the internal electrode 7 is not electrically connected.

The conductor 13 is located in the same layer as the internal electrode 9A and is separated from the internal electrode 9A. The conductor 13 includes one end exposed to a corresponding end surface 3*e* of the pair of end surfaces 3*e*. The one end of the conductor 13 is exposed to the end surface 3*e* to which the one end of the internal electrode 7 is exposed. The one end of the conductor 13 is entirely covered by a corresponding electrode portion 5*e* of the plurality of electrode portions 5*e*. The conductor 13 is directly connected to the corresponding electrode portion 5*e*. The conductor 13 is electrically connected to a corresponding external electrode 5 of the pair of external electrodes 5. For example, the conductor 13 is electrically connected to the external electrode 5 (electrode portion 5*e*) to which the internal electrode 7 is electrically connected. The conductor 13 is electrically connected to the external electrode 5 to which the internal electrode 9 is not electrically connected.

The conductor 11 opposes the internal electrode 9 and does not oppose the internal electrode 7, in the third direction D3. The conductor 13 opposes the internal electrode 7 and does not oppose the internal electrode 9, in the third direction D3. The conductors 11 and 13 include, for example, dummy conductors that tend not to contribute to generation of capacitance.

The plurality of internal electrodes 7 except the internal electrode 7A oppose the second electrode layer E2 included in the electrode portion 5*a* that is electrically connected to the internal electrode 9, for example, in the second direction D2. When the plurality of internal electrodes 7 except the internal electrode 7A and the second electrode layer E2 included in the electrode portion 5*a* that is electrically connected to the internal electrode 9 are viewed from, for example, in the second direction D2, the plurality of internal electrodes 7 except the internal electrode 7A and the second electrode layer E2 included in the electrode portion 5*a* that is electrically connected to the internal electrode 9 overlap each other. Therefore, an electric field tends to be generated between the plurality of internal electrodes 7 except the internal electrode 7A and the second electrode layer E2 included in the electrode portion 5*a* that is electrically connected to the internal electrode 9.

The film portion EIa is located between the plurality of internal electrodes 7 except the internal electrode 7A and the second electrode layer E2 included in the electrode portion 5*a* that is electrically connected to the internal electrode 9. The plurality of internal electrodes 7 except the internal electrode 7A and the second electrode layer E2 included in the electrode portion 5*a* that is electrically connected to the internal electrode 9 oppose each other in a state in which the film portion EIa is present between the plurality of internal electrodes 7 except the internal electrode 7A and the second electrode layer E2 included in the electrode portion 5*a* that is electrically connected to the internal electrode 9. The plurality of internal electrodes 7 except the internal electrode 7A and the second electrode layer E2 included in the electrode portion 5*a* that is electrically connected to the internal electrode 9 indirectly oppose each other.

The plurality of internal electrodes 9 except the internal electrode 9A oppose the second electrode layer E2 included in the electrode portion 5*a* that is electrically connected to the internal electrode 7, for example, in the second direction D2. When the plurality of internal electrodes 9 except the internal electrode 9A and the second electrode layer E2 included in the electrode portion 5*a* that is electrically connected to the internal electrode 7 are viewed from, for example, in the second direction D2, the plurality of internal electrodes 9 except the internal electrode 9A and the second electrode layer E2 included in the electrode portion 5*a* that is electrically connected to the internal electrode 7 overlap each other. Therefore, an electric field tends to be generated between the plurality of internal electrodes 9 except the internal electrode 9A and the second electrode layer E2 included in the electrode portion 5*a* that is electrically connected to the internal electrode 7.

The film portion EIa is located between the plurality of internal electrodes 9 except the internal electrode 9A and the second electrode layer E2 included in the electrode portion 5*a* that is electrically connected to the internal electrode 7. The plurality of internal electrodes 9 except the internal electrode 9A and the second electrode layer E2 included in the electrode portion 5*a* that is electrically connected to the internal electrode 7 oppose each other in a state in which the film portion EIa is present between the plurality of internal electrodes 9 except the internal electrode 9A and the second electrode layer E2 included in the electrode portion 5*a* that is electrically connected to the internal electrode 7. The plurality of internal electrodes 9 except the internal electrode 9A and the second electrode layer E2 included in the electrode portion 5*a* that is electrically connected to the internal electrode 7 indirectly oppose each other.

The internal electrode 7A does not oppose the second electrode layer E2 included in the electrode portion 5*a* that is electrically connected to the internal electrode 9, for example, in the second direction D2. When the internal electrode 7A and the second electrode layer E2 included in the electrode portion 5*a* that is electrically connected to the internal electrode 9 are viewed from, for example, in the second direction D2, the internal electrode 7A and the second electrode layer E2 included in the electrode portion 5*a* that is electrically connected to the internal electrode 9 do not overlap each other. Therefore, an electric field tends not to be generated between the internal electrode 7A and the second electrode layer E2 included in the electrode portion 5*a* that is electrically connected to the internal electrode 9.

The internal electrode 9A does not oppose second electrode layer E2 included in the electrode portion 5*a* that is electrically connected to the internal electrode 7, for example, in the second direction D2. When the internal electrode 9A and the second electrode layer E2 included in the electrode portion 5*a* that is electrically connected to the internal electrode 7 are viewed from, for example, in the second direction D2, the internal electrode 9A and the second electrode layer E2 included in the electrode portion 5*a* that is electrically connected to the internal electrode 7 do not overlap each other. Therefore, an electric field tends not to be generated between the internal electrode 9A and the second electrode layer E2 included in the electrode portion 5*a* that is electrically connected to the internal electrode 7.

The internal electrode 7A does not oppose the second electrode layer E2 included in the electrode portion 5*c* that is electrically connected to the internal electrode 9, for example, in the third direction D3. When the internal electrode 7A and the second electrode layer E2 included in the electrode portion 5*c* that is electrically connected to the internal electrode 9 are viewed from, for example, in the third direction D3, the internal electrode 7A and the second electrode layer E2 included in the electrode portion 5*c* that is electrically connected to the internal electrode 9 do not overlap each other. Therefore, an electric field tends not to be generated between the internal electrode 7A and the second electrode layer E2 included in the electrode portion 5*c* that is electrically connected to the internal electrode 9.

The internal electrode 9A does not oppose second electrode layer E2 included in the electrode portion 5*c* that is electrically connected to the internal electrode 7, for example, in the third direction D3. When the internal electrode 9A and the second electrode layer E2 included in the electrode portion 5*c* that is electrically connected to the internal electrode 7 are viewed from, for example, in the third direction D3, the internal electrode 9A and the second electrode layer E2 included in the electrode portion 5*c* that is electrically connected to the internal electrode 7 do not overlap each other. Therefore, an electric field tends not to be generated between the internal electrode 9A and the second electrode layer E2 included in the electrode portion 5*c* that is electrically connected to the internal electrode 7.

The conductor 11 opposes the second electrode layer E2 included in the electrode portion 5*c* that is electrically connected to the internal electrode 9, for example, in the third direction D3. When the conductor 11 and the second electrode layer E2 included in the electrode portion 5*c* that is electrically connected to the internal electrode 9 are viewed from, for example, in the third direction D3, the conductor 11 and the second electrode layer E2 included in the electrode portion 5*c* that is electrically connected to the internal electrode 9 overlap each other. The conductor 11 is electrically connected to the internal electrode 9. Therefore, an electric field tends not to be generated between the conductor 11 and the second electrode layer E2 included in the electrode portion 5*c* that is electrically connected to the internal electrode 9.

The conductor 13 opposes the second electrode layer E2 included in the electrode portion 5*c* that is electrically connected to the internal electrode 7, for example, in the third direction D3. When the conductor 13 and the second electrode layer E2 included in the electrode portion 5*c* that is electrically connected to the internal electrode 7 are viewed from, for example, in the third direction D3, the conductor 13 and the second electrode layer E2 included in the electrode portion 5*c* that is electrically connected to the internal electrode 7 overlap each other. The conductor 13 is electrically connected to the internal electrode 7. Therefore, an electric field tends not to be generated between the conductor 13 and the second electrode layer E2 included in the electrode portion 5*c* that is electrically connected to the internal electrode 7.

In the multilayer capacitor C1, the film portion EIa included in the electrical insulating film EI is located at least on the region included in the main surface 3*a*, the region being between the plurality of external electrodes 5. Therefore, even when a metal particle included in the second electrode layer E2 is ionized, the film portion EIa prevents the generated metal ion from reacting with an electron supplied from the internal electrodes 7 and 9 or the external electrodes 5. The electron tends not to be supplied to the metal ion. The metal tends not to deposit on the main surface 3*a*. Consequently, the multilayer capacitor C1 reduces occurrence of migration.

In a configuration in which the electrical insulating film EI is located on the element body 3, the electrical insulating film EI may impede connection between the internal electrodes 7 and 9 and the external electrodes 5. In the multilayer capacitor C1, the plurality of internal electrodes 7 and 9 are exposed from the electrical insulating film EI at the corresponding end surface 3*e*. Therefore, the electrical insulating film EI on the element body 3 tends not to impede the connection between the internal electrodes 7 and 9 and the external electrodes 5. Consequently, the multilayer capacitor C1 reduces deterioration of connectivity between the internal electrodes 7 and 9 and the external electrodes 5.

In the multilayer capacitor C1, the film portion EIa is located between the main surface 3*a* and the second electrode layer E2 included in the electrode portion 5*a*.

The film portion EIa is located between the plurality of internal electrodes 7 except the internal electrode 7A and the second electrode layer E2 included in the electrode portion 5*a* that is electrically connected to the internal electrode 9. Therefore, even when the external electrode 5 to which the internal electrode 9 is electrically connected has, for example, a positive polarity, electrons are reliably prevented from being supplied from the internal electrode 7 to metal ions. Consequently, the multilayer capacitor C1 further reduces the occurrence of the migration.

The film portion EIa is located between the plurality of internal electrodes 9 except the internal electrode 9A and the second electrode layer E2 included in the electrode portion 5*a* that is electrically connected to the internal electrode 7. Therefore, even when the external electrode 5 to which the internal electrode 7 is electrically connected has, for example, a positive polarity, electrons are reliably prevented from being supplied from the internal electrode 9 to metal ions. Consequently, the multilayer capacitor C1 further reduces the occurrence of the migration.

In the multilayer capacitor C1, the electrical insulating film EI includes only the film portion EIa on the main surface 3*a*. Therefore, the multilayer capacitor C1 reliably reduces the deterioration of the connectivity between the internal electrodes 7 and 9 and the external electrodes 5.

In the multilayer capacitor C1, each of the plurality of internal electrodes 7 and 9 is disposed to extend in the direction intersecting the main surface 3*a* and includes the one end exposed to the corresponding end surface 3*e*. The one end each included in the plurality of internal electrodes 7 and 9 includes the region exposed from the electrical insulating film EI.

In the multilayer capacitor C1, all of the plurality of internal electrodes 7 and 9 are reliably connected to the corresponding external electrode 5 of the plurality of external electrodes 5. Therefore, multilayer capacitor C1 reliably reduces the deterioration of the connectivity between the internal electrodes 7 and 9 and the external electrodes 5.

In the multilayer capacitor C1, the second electrode layer E2 included in the electrode portion 5*c* that is electrically connected to the internal electrode 9 opposes the conductor 11. Therefore, the second electrode layer E2 included in the electrode portion 5*c* that is electrically connected to the internal electrode 9 tends not to oppose the internal electrode 7. The metal particle included in the second electrode layer E2 included in the electrode portion 5*c* that is electrically connected to the internal electrode 9 tends not to be ionized.

In the multilayer capacitor C1, the second electrode layer E2 included in the electrode portion 5*c* that is electrically connected to the internal electrode 7 opposes the conductor 13. Therefore, the second electrode layer E2 included in the electrode portion 5*c* that is electrically connected to the internal electrode 7 tends not to oppose the internal electrode 9. The metal particle included in the second electrode layer E2 included in the electrode portion 5*c* that is electrically connected to the internal electrode 7 tends not to be ionized.

Consequently, the multilayer capacitor C1 reliably reduces the occurrence of the migration.

In the multilayer capacitor C1, the second electrode layer E2 continuously covers a part of the main surface 3*a*, a part of the corresponding end surface 3*e*, and a part of the side surface 3*c*.

The multilayer capacitor C1 tends to lead to a decrease in the amount of the conductive resin paste used to form the second electrode layer E2, as compared with a configuration in which the second electrode layer E2 continuously covers a part of the main surface 3*a*, the entire corresponding end surface 3*e*, and a part of the side surface 3*c*. The decrease in the amount of the conductive resin paste tends to lead to a decrease in a length of a layer included in the second electrode layer E2 and located on the main surface 3*a* in the first direction D1 and an increase in a distance between the plurality of external electrodes 5 on the main surface 3*a*. The increase in the distance between the plurality of external electrodes 5 reduces an electric field between the plurality of external electrodes 5. Therefore, the generated metal ion tends not to migrate from the second electrode layer E2. Consequently, the multilayer capacitor C1 can further reduces the occurrence of the migration.

In the multilayer capacitor C1, the second electrode layer E2 included in the electrode portion 5*e* covers only a part of the corresponding end surface 3*e*. Therefore, the multilayer capacitor C1 reduces ESR (equivalent series resistance).

In the multilayer capacitor C1, the electrical insulating film EI includes the silicon oxide film.

The silicon oxide film has a high electrical insulation property. Silver tends not to diffuse into the silicon oxide film. Therefore, even in a configuration in which the second electrode layer E2 includes the plurality of silver particles, the electrical insulating property of the electrical insulating film EI can be maintained.

Consequently, the multilayer capacitor C1 reliably reduces the occurrence of the migration.

The second electrode layer E2 includes the plurality of silver particles. The silver particles tend to cause migration than, for example, copper particles.

The multilayer capacitor C1 reliably reduces the occurrence of the migration even when the second electrode layer E2 includes the plurality of silver particles.

Figure 6:
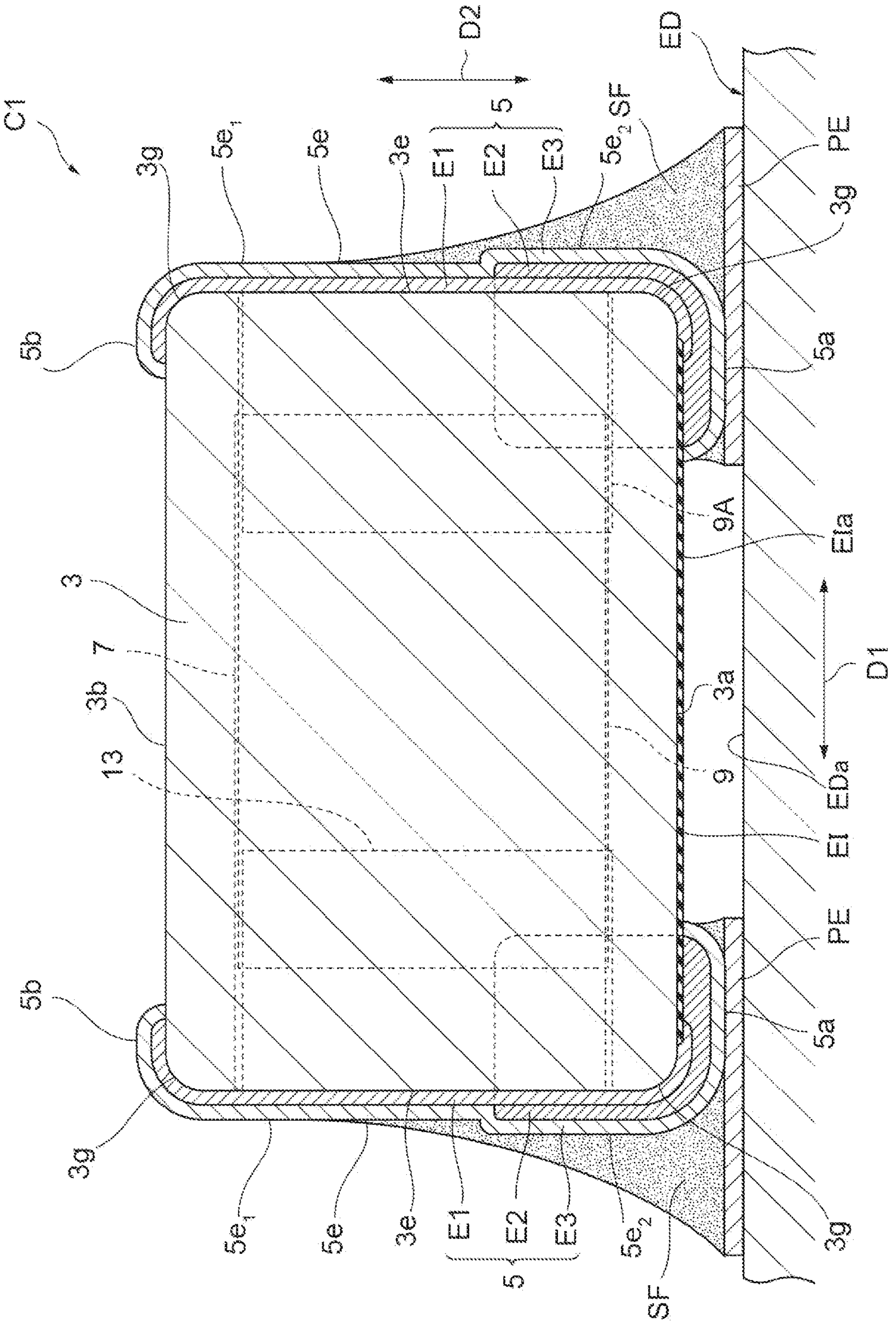
FIG. 6 is a view illustrating a cross-sectional configuration of an electronic component device including the multilayer capacitor according to the first example.

Next, a configuration of an electronic component device including the multilayer capacitor according to the first example will be described with reference to FIG. 6. FIG. 6 is a view illustrating a cross-sectional configuration of the electronic component device.

As illustrated in FIG. 6, the electronic component device includes the multilayer capacitor C1 and an electronic device ED. The electronic device ED includes, for example, a circuit board or an electronic component. The multilayer capacitor C1 is solder-mounted on the electronic device ED. The electronic device ED includes a main surface EDa and two pad electrodes PE. Each pad electrode PE is disposed on the main surface EDa. The two pad electrodes PE are separated from each other. The multilayer capacitor C1 is disposed on the electronic device ED in such a manner that the main surface 3*a* arranged to constitute the mounting surface and the main surface EDa oppose each other. Each of the internal electrodes 7 and 9 is located in a plane substantially orthogonal to the main surface EDa.

In solder-mounting the multilayer capacitor C1, the molten solder wets the external electrode 5 (third electrode layer E3). Solidification of the wet solder causes a solder fillet SF to be formed on the external electrode 5. The external electrodes 5 and the pad electrodes PE corresponding to each other are connected to each other through the solder fillet SF.

Figure 7:
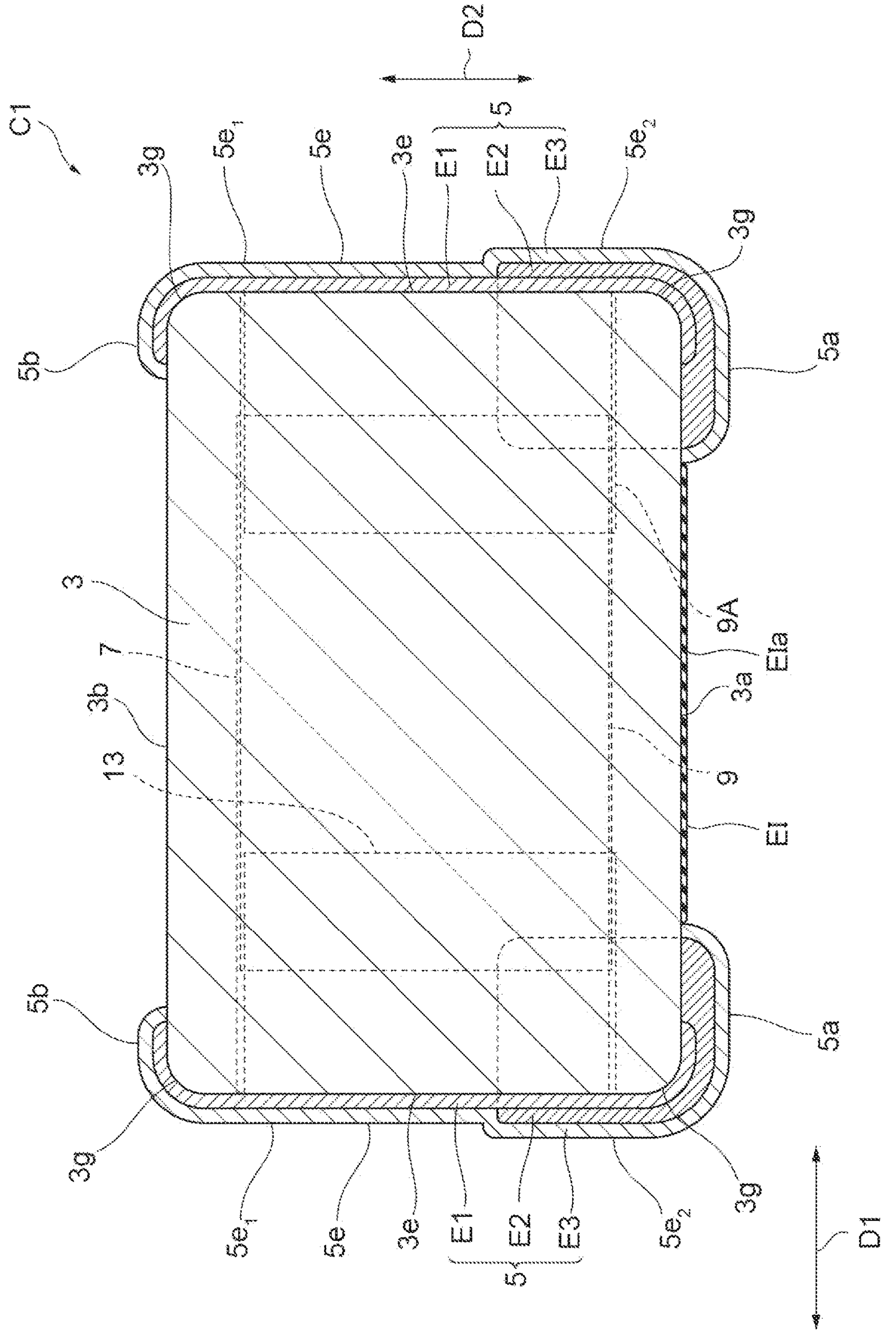
FIG. 7 is a view illustrating a cross-sectional configuration of a multilayer capacitor according to a first modified example of the first example.

Next, a configuration of a multilayer capacitor C1 according to a first modified example of the first example will be described with reference to FIG. 7. FIG. 7 is a view illustrating a cross-sectional configuration of a multilayer capacitor according to the first modified example.

The multilayer capacitor C1 according to the first modified example is generally similar to or the same as the multilayer capacitor C1 according to the first example described above. However, the first modified example is different from the above-described first example in a configuration of the electrical insulating film EI. Hereinafter, differences between the above-described first example and the first modified example will be mainly described. In FIG. 7, for the sake of explanation, the internal electrodes 7 and 9 and the conductor 13 are intentionally illustrated so as to deviate from each other in the second direction D2.

The first electrode layer E1 of the electrode portion 5*a* covers a part of the main surface 3*a* and the entire ridge portion 3*g*. The first electrode layer E1 of the electrode portion 5*a* is in contact with the element body 3 on the above-described part of the main surface 3*a* and on the entire ridge portion 3*g*. In the electrode portion 5*a*, the first electrode layer E1 is in direct contact with the element body 3. The main surface 3*a* is directly covered with the first electrode layer E1 at the above-described part, and is exposed from the first electrode layer E1 at the remaining part except the above-described part.

In the electrode portion 5*a*, the second electrode layer E2 is disposed on the first electrode layer E1 and the element body 3 to cover the first electrode layer E1 and a part of the main surface 3*a*. In the electrode portion 5*a*, the second electrode layer E2 is in direct contact with the first electrode layer E1 and the element body 3. In the electrode portion 5*a*, the second electrode layer E2 indirectly covers the main surface 3*a* in such a manner that the first electrode layer E1 is located between the second electrode layer E2 and the main surface 3*a*. In the electrode portion 5*a*, the second electrode layer E2 directly covers the main surface 3*a*.

As illustrated in FIG. 7, the film portion EIa included in the electrical insulating film EI is disposed on a region included in the main surface 3*a*, the region being exposed from the second electrode layer E2 included in the electrode portion 5*a*. The film portion EIa does not include a portion covered with the second electrode layer E2 included in the electrode portion 5*a*. The film portion EIa includes only the region exposed from the second electrode layer E2 included in the electrode portion 5*a*. The film portion EIa may be in contact with the second electrode layer E2 or may be separated from the second electrode layer E2.

Also in the multilayer capacitor C1 according to the first modified example, the film portion EIa is located at least on a region included in the surface of the element body 3, the region being between the plurality of external electrodes 5. Therefore, the multilayer capacitor C1 according to the first modified example reduces occurrence of migration as described above.

Figure 8:
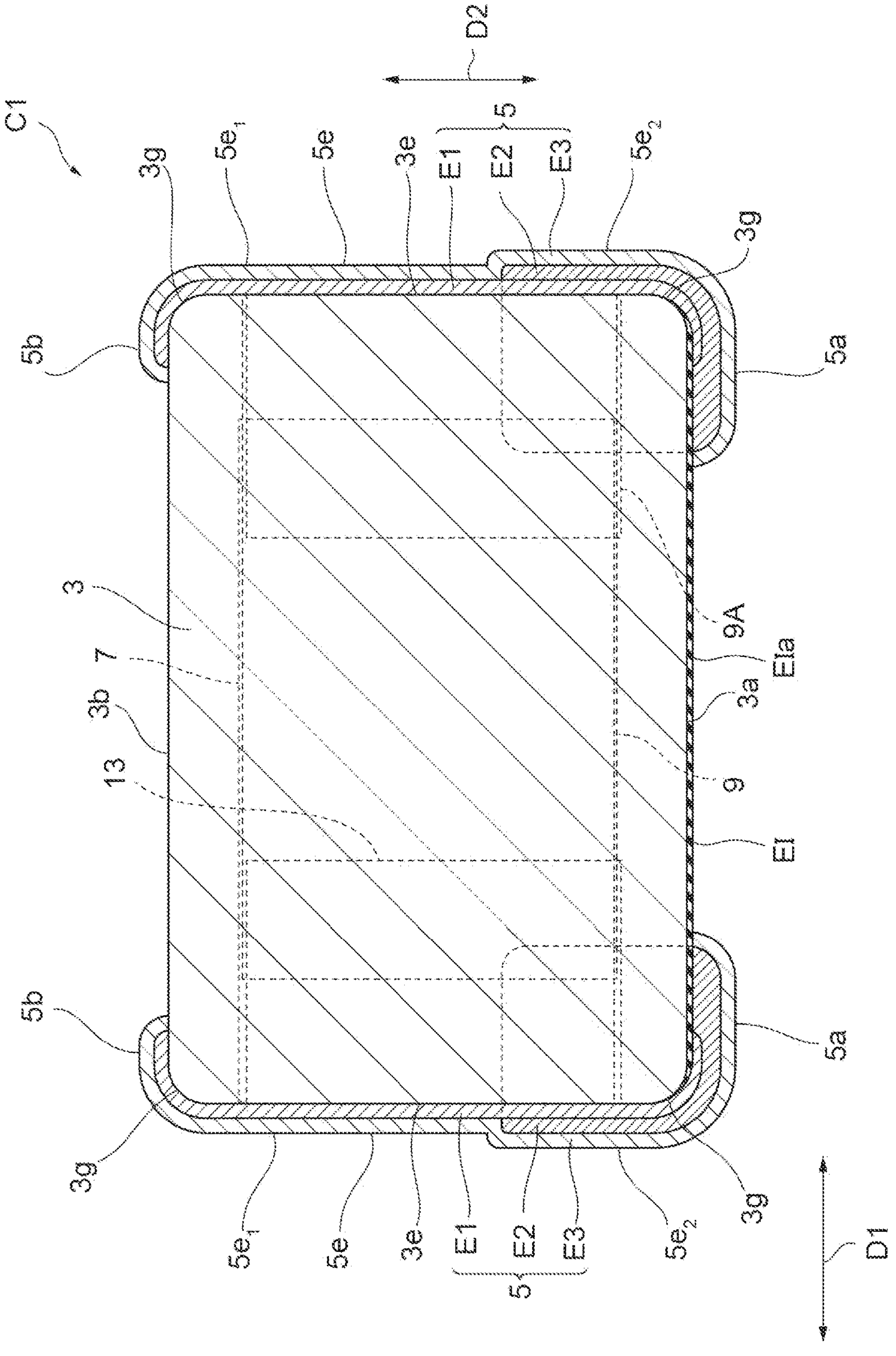
FIG. 8 is a view illustrating a cross-sectional configuration of a multilayer capacitor according to a second modified example of the first example.
Figure 9:
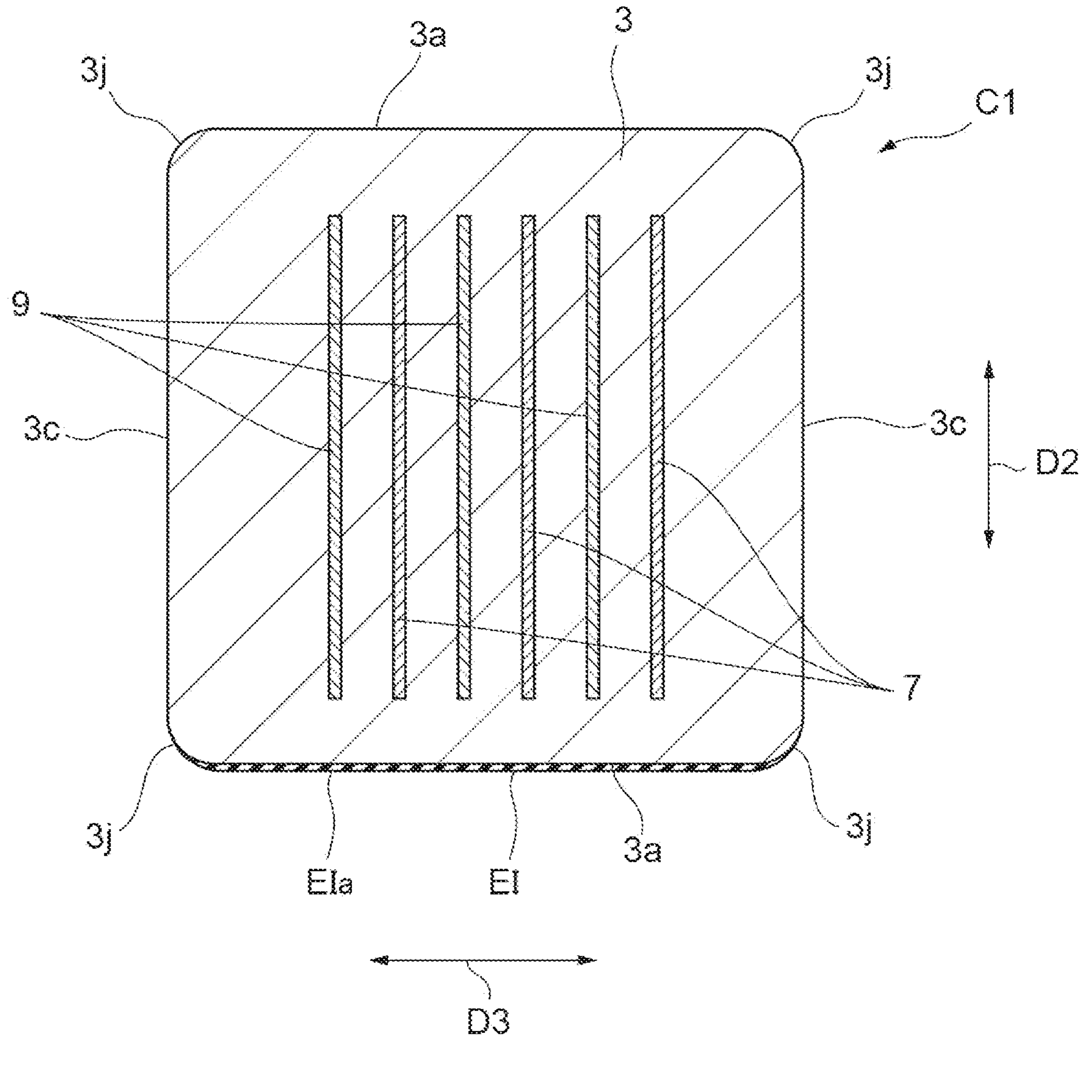
FIG. 9 is a view illustrating a cross-sectional configuration of the multilayer capacitor according to the second modified example of the first example.

Next, a configuration of a multilayer capacitor C1 according to a second modified example of the first example will be described with reference to FIGS. 8 and 9. FIGS. 8 and 9 are views illustrating a cross-sectional configuration of a multilayer capacitor according to the second modified example.

The multilayer capacitor C1 according to the second modified example is generally similar to or the same as the multilayer capacitor C1 according to the first example described above. However, the second modified example is different from the above-described first example in a configuration of the electrical insulating film EI. Hereinafter, differences between the above-described first example and the second modified example will be mainly described. In FIG. 8, for the sake of explanation, the internal electrodes 7 and 9 and the conductor 13 are intentionally illustrated so as to deviate from each other in the second direction D2.

As illustrated in FIGS. 8 and 9, the film portion EIa included in the electrical insulating film EI is disposed not only on the main surface 3*a* but also on a pair of ridge portions 3$j$ located between the main surface 3$a$ and the side surface 3$c$ and on a pair of ridge portions 3$g$ located between the main surface 3$a$ and the end surface 3$e$. The film portion EIa covers the main surface 3$a$, the pair of ridge portions 3$j$, and the pair of ridge portions 3$g$, and is in direct contact with the main surface 3$a$, the pair of ridge portions 3$j$, and the pair of ridge portions 3$g$. The film portion EIa is located only on the main surface 3$a$, pair of ridge portions 3$j$, and pair of ridge portions 3$g$. For example, the electrical insulating film EI is formed on substantially the entire main surface 3$a$, pair of ridge portions 3$j$, and pair of ridge portions 3$g$. Each side surface 3$c$, each end surface 3$e$ and each edge portion 3$i$ are exposed from the electrical insulating film EI.

The first electrode layer E1 of the electrode portion 5$a$ is disposed on the electrical insulating film EI. The first electrode layer E1 of the electrode portion 5$a$ is in direct contact with the electrical insulating film EI on the ridge portions 3$j$ and 3$g$.

In the multilayer capacitor C1 according to the second modified example, the film portion EIa is located on ridge regions included the pair of ridge portions 3$j$, the ridge regions being between the plurality of external electrodes 5. The metal tends not to deposit not only on the main surface 3$a$ but also on the pair of ridge portions 3$j$. Therefore, the multilayer capacitor C1 according to the second modified example further reduces the occurrence of the migration.

The electrical insulating film EI may also be disposed on a part of the side surface 3$c$. In this case, the electrical insulating film EI includes the film portion EIa on the main surface 3$a$ and a film portion on the above-described part of the side surface 3$c$. The film portion on the above-described part of the side surface 3$c$ is continuous with the film portion EIa. The side surface 3$c$ is exposed from the electrical insulating film EI except for the above-described part covered with the electrical insulating film EI.

The electrical insulating film EI may also be disposed on a part of the end surface 3$e$. In this case, the electrical insulating film EI includes the film portion EIa on the main surface 3$a$ and a film portion on the above-described part of the end surface 3$e$. The film portion on the above-described part of the end surface 3$e$ is continuous with the film portion EIa. The end surface 3$e$ is exposed from the electrical insulating film EI except for the above-described part covered with the electrical insulating film EI. In a configuration in which the electrical insulating film EI includes the film portion on the above-described part of the end surface 3$e$, one end of each of the plurality of internal conductors included in the multilayer capacitor C1 may be exposed from the electrical insulating film EI in the remaining part excluding the above-described part.

As in the first modified example, the electrical insulating film EI (film portion EIa) may be disposed on a region included in the main surface 3$a$ and the pair of ridge portions 3$j$, the region being exposed from the second electrode layer E2 included in the electrode portion 5$a$.

Second Example

Figure 10:
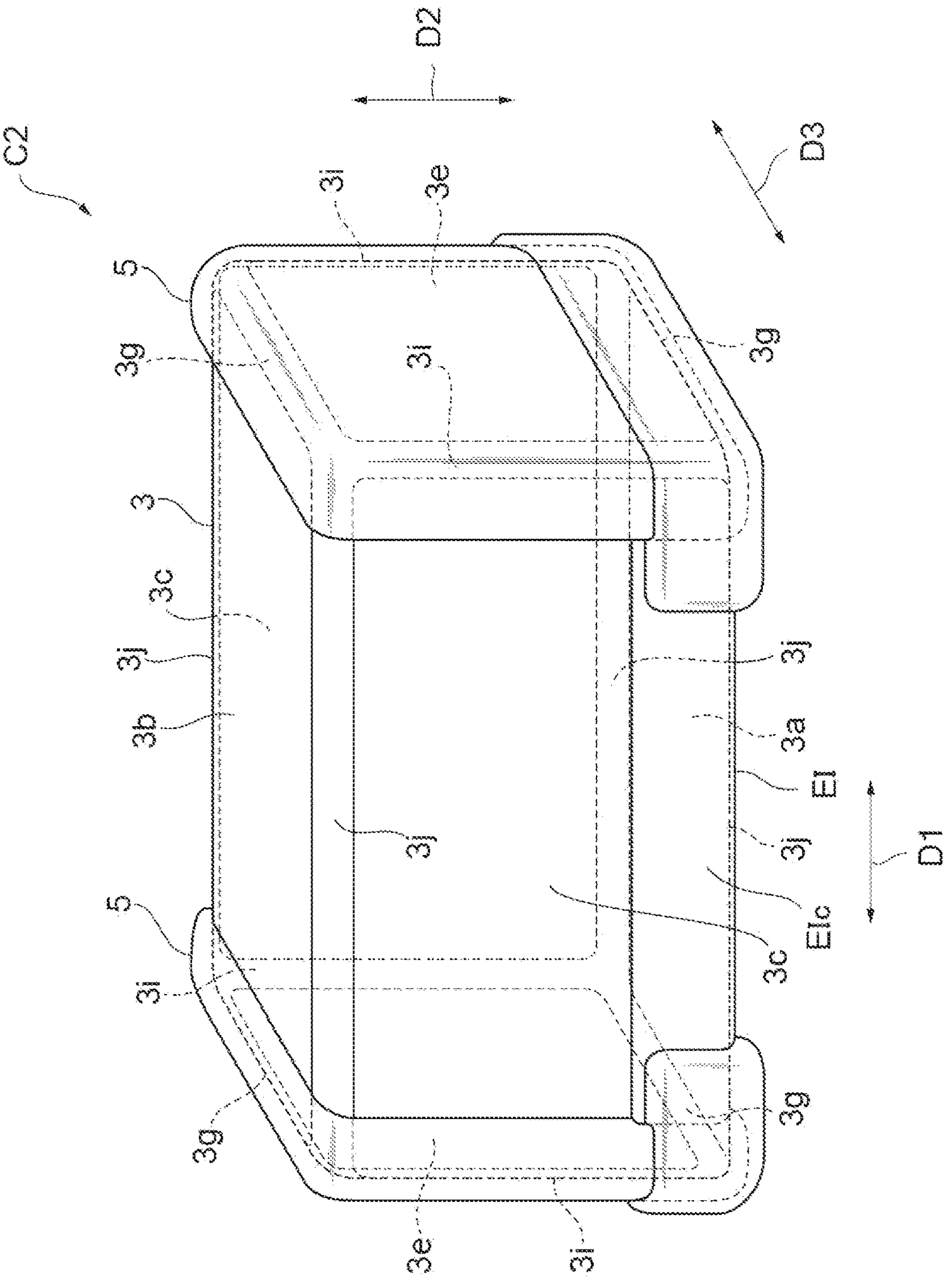
FIG. 10 is a perspective view of a multilayer capacitor according to a second example.

A configuration of a multilayer capacitor C2 according to the second example will be described with reference to FIGS. 10 to 14. FIG. 10 is a perspective view of a multilayer capacitor according to the second example. FIGS. 11, 12, 13, and 14 are views illustrating a cross-sectional configuration of the multilayer capacitor according to the second example.

In the second example, an electronic component includes, for example, the multilayer capacitor C2. The multilayer capacitor C2 is generally similar to or the same as the multilayer capacitor C1. However, the multilayer capacitor C2 is different from the multilayer capacitor C1 in a configuration of the plurality of internal conductors and the electrical insulating film EI. Hereinafter, differences between the multilayer capacitor C1 and the multilayer capacitor C2 will be mainly described.

As illustrated in FIGS. 10 to 14, the multilayer capacitor C2 includes an element body 3 of a rectangular parallelepiped shape, a plurality of external electrodes 5, a plurality of internal electrodes 7, and a plurality of internal electrodes 9. For example, the multilayer capacitor C2 includes a pair of external electrodes 5. The element body 3 includes a pair of main surfaces 3$a$ and 3$b$ opposing each other, a pair of side surfaces 3$c$ opposing each other, and a pair of end surfaces 3$e$ opposing each other. Each external electrode 5 includes a plurality of electrode portion 5$a$, 5$b$, 5$c$, and 5$e$. Each of the electrode portions 5$a$, 5$c$, and 5$e$ includes the first electrode layer E1, the second electrode layer E2, and the third electrode layer E3. The electrode portion 5$b$ includes the first electrode layer E1 and the third electrode layer E3.

Figure 11:
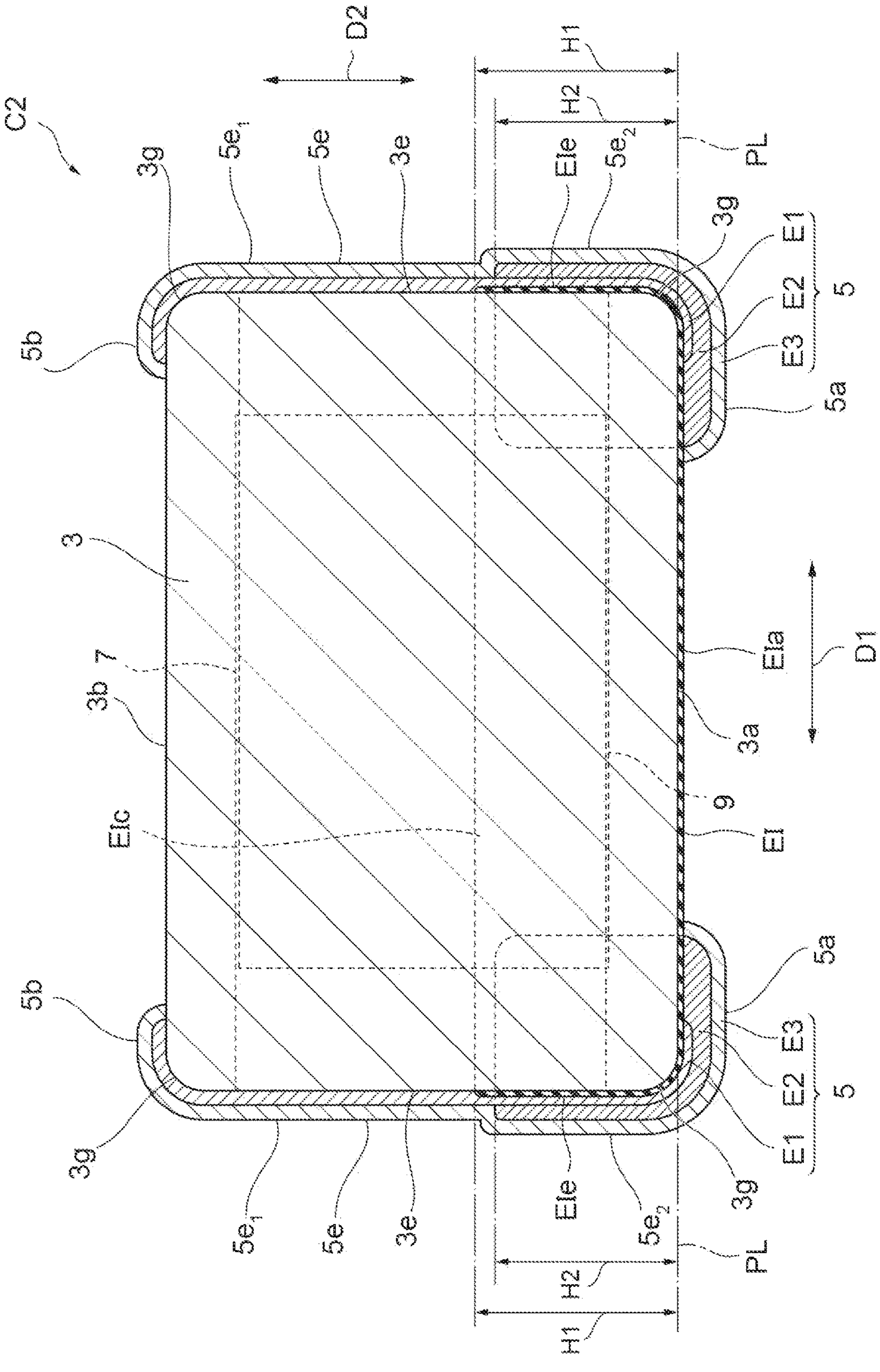
FIG. 11 is a view illustrating a cross-sectional configuration of the multilayer capacitor according to the second example.
Figure 12:
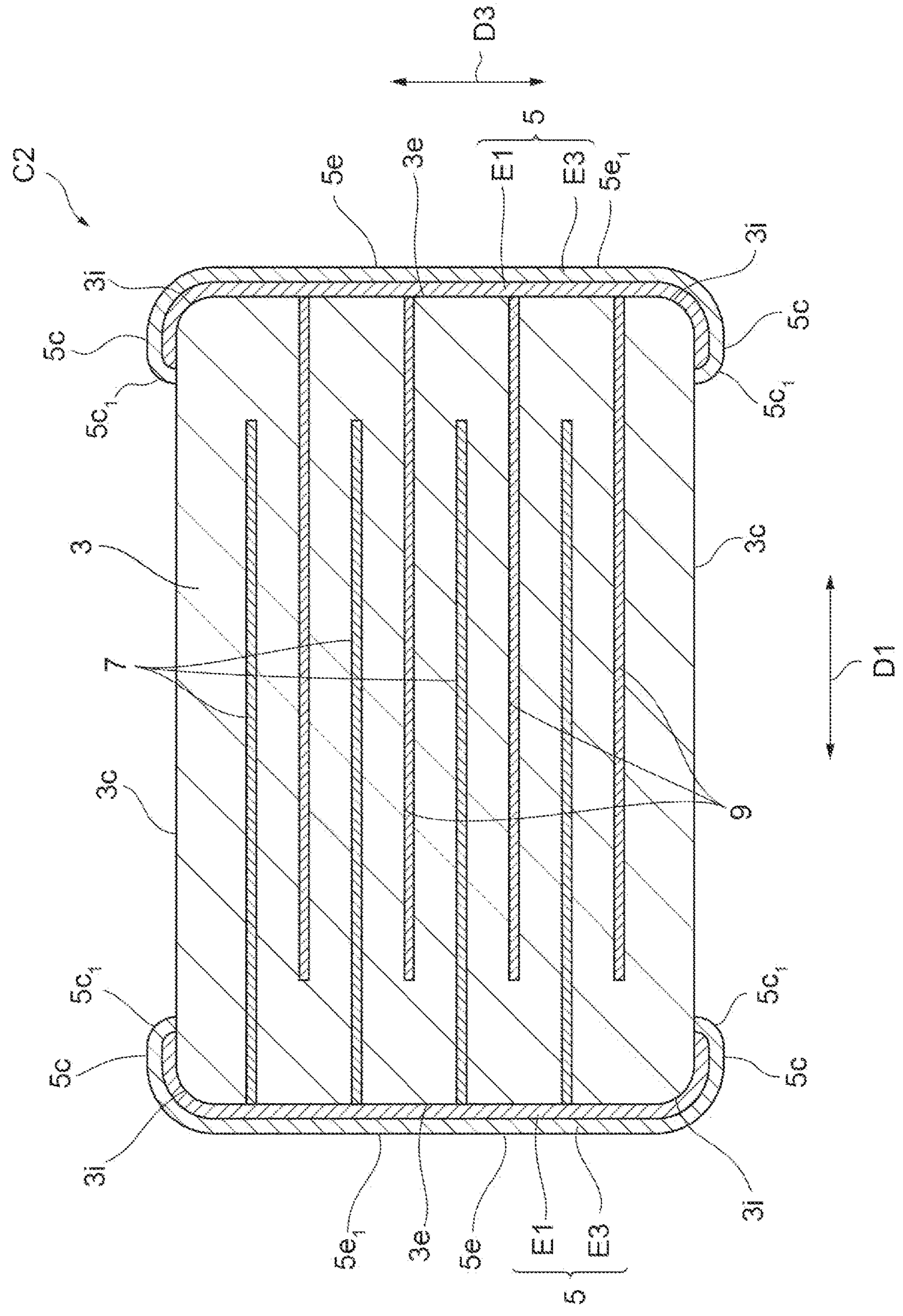
FIG. 12 is a view illustrating a cross-sectional configuration of the multilayer capacitor according to the second example.

The plurality of internal electrodes 7 and the plurality of internal electrodes 9 are alternately disposed in the third direction D3 in the same manner as the plurality of internal electrodes 7 and 9 included in the multilayer capacitor C1. In the multilayer capacitor C2, the plurality of internal conductors includes the conductors 11 and 13. In FIG. 11, for the sake of explanation, the internal electrodes 7 and 9 are intentionally illustrated so as to deviate from each other in the second direction D2.

Figure 13:
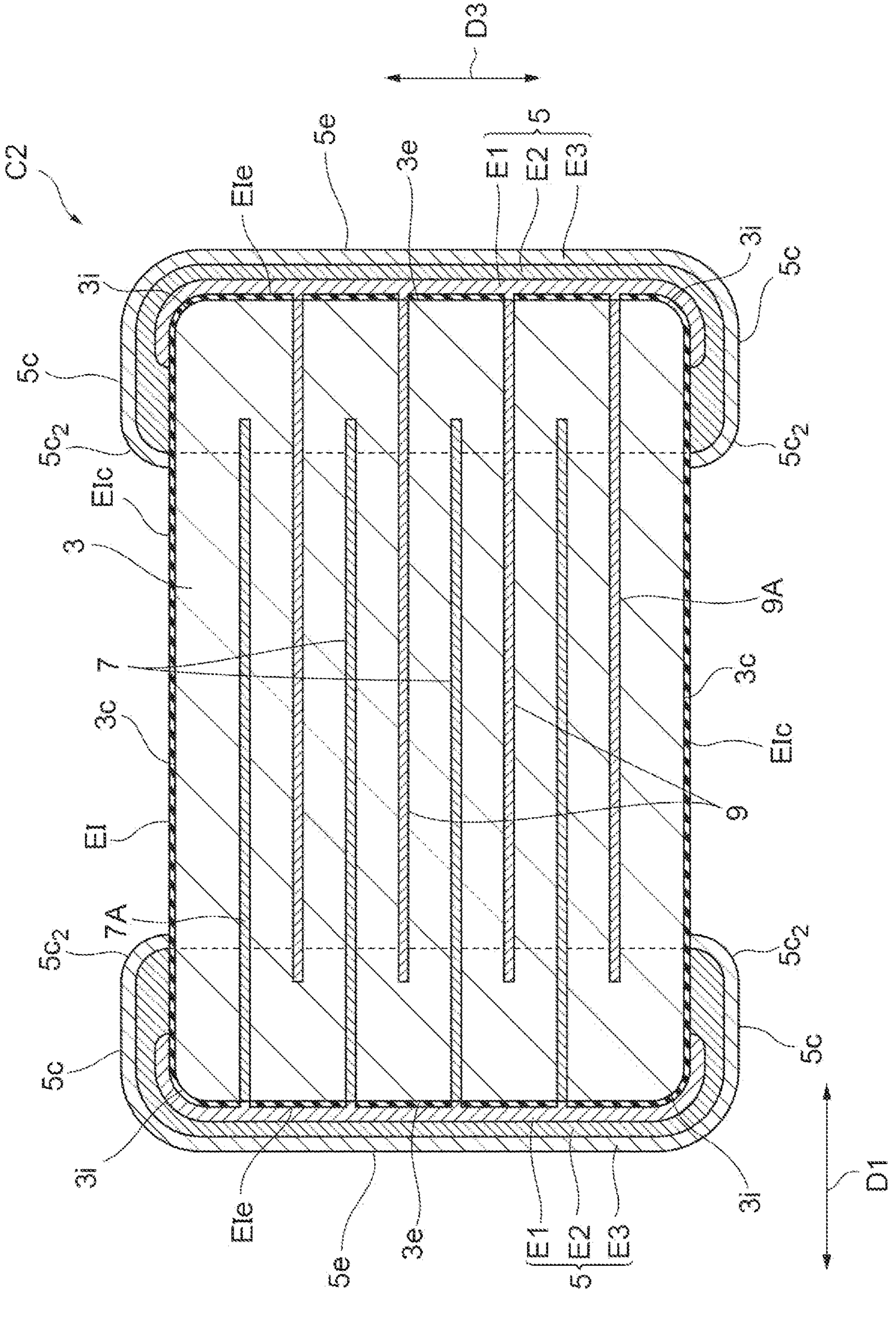
FIG. 13 is a view illustrating a cross-sectional configuration of the multilayer capacitor according to the second example.
Figure 14:
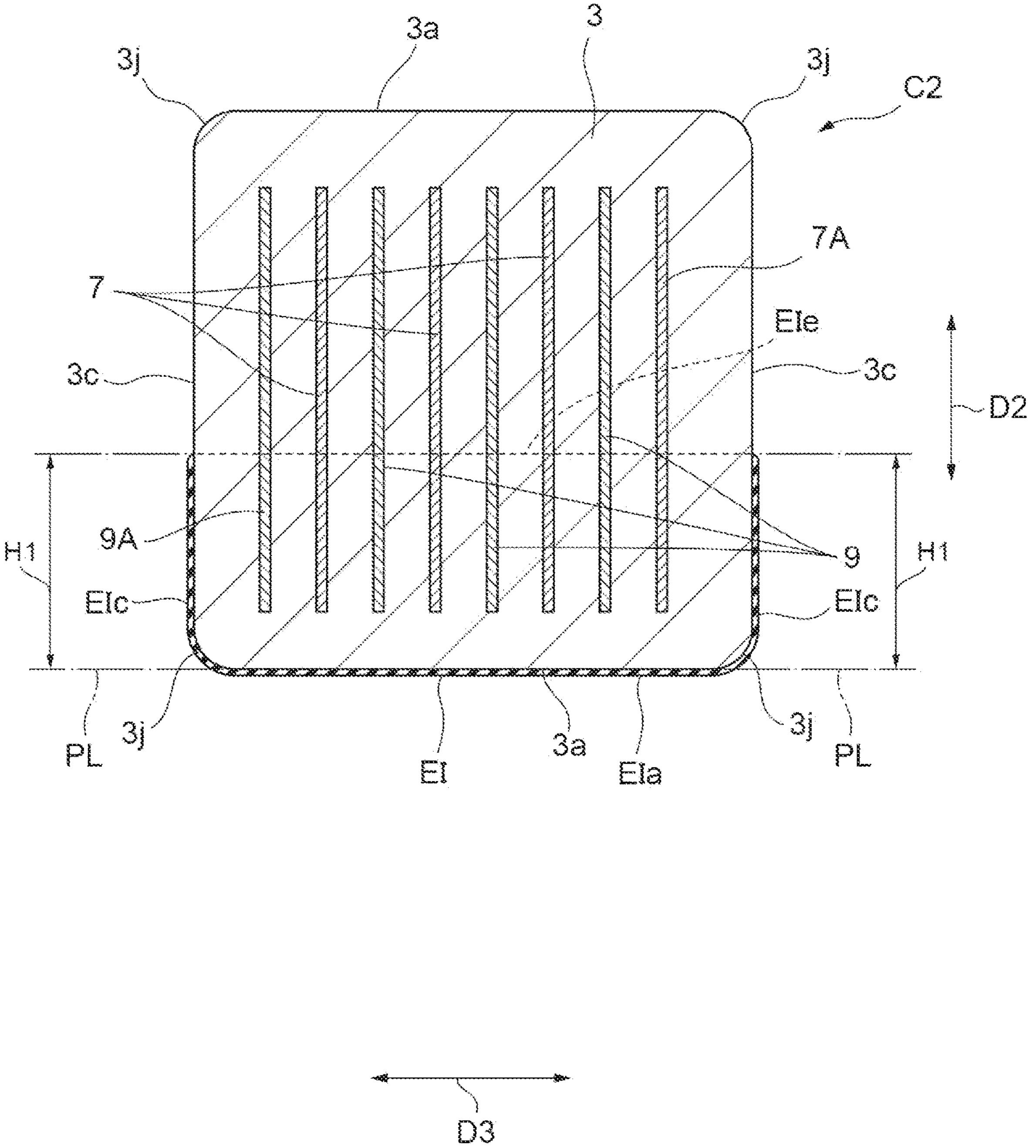
FIG. 14 is a view illustrating a cross-sectional configuration of the multilayer capacitor according to the second example.
Figure 15:
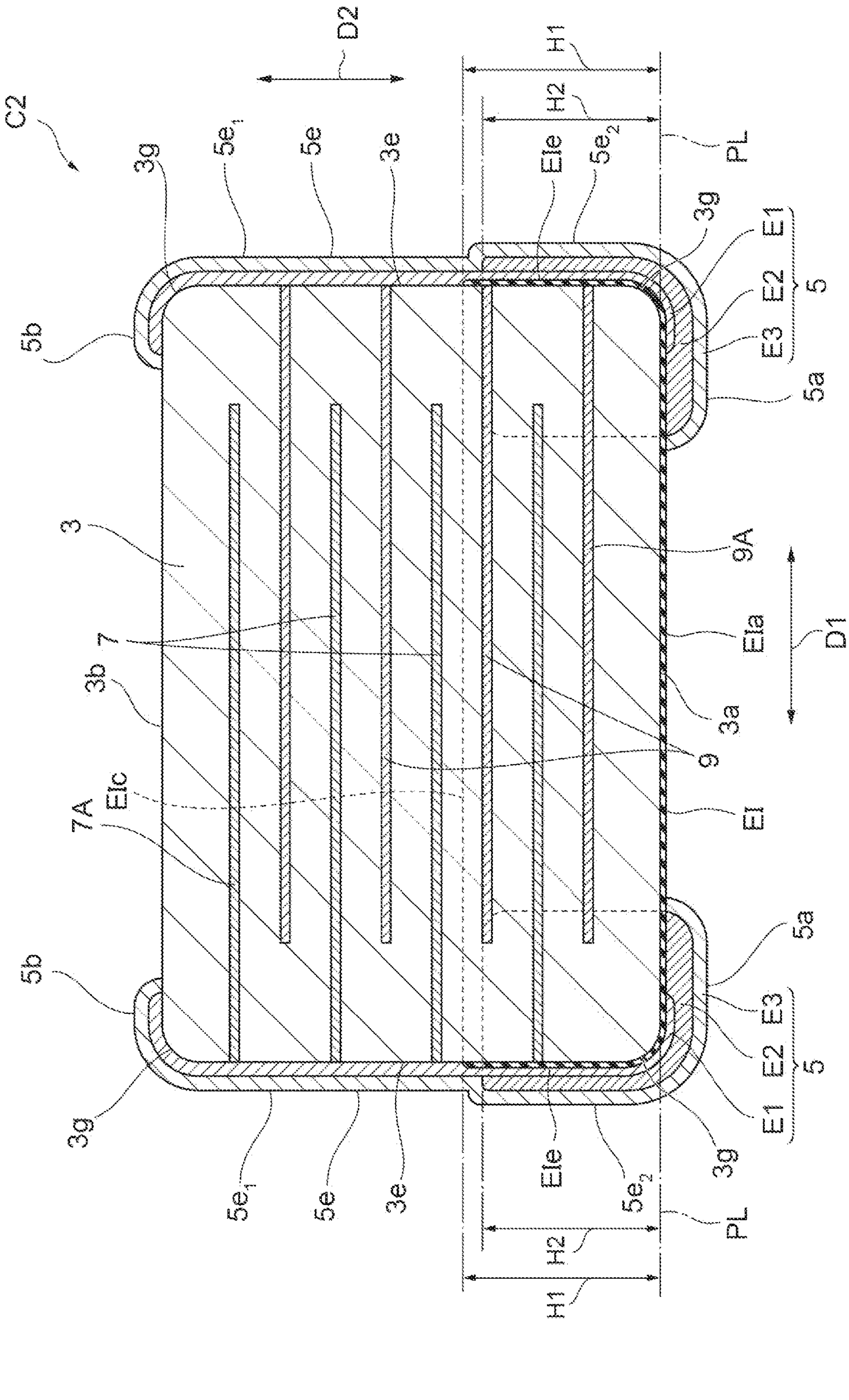
FIG. 15 is a view illustrating a cross-sectional configuration of a multilayer capacitor according to a modified example of the second example.

As illustrated in FIGS. 10, 13, and 14, the electrical insulating film EI includes a plurality of film portions EIa, EIc, and EIe. For example, the electrical insulating film EI includes one film portion EIa, one pair of film portions EIc, and one pair of film portions EIe. The film portion EIa is disposed on the main surface 3$a$. The film portion EIa covers the main surface 3$a$ and is in direct contact with the main surface 3$a$.

Each film portion EIc is disposed on a corresponding side surface 3$c$ of the pair of side surfaces 3$c$. Each film portion EIc is disposed on a part of the corresponding side surface 3$c$. Each film portion EIc covers the above-described part of the corresponding side surface 3$c$ and is in direct contact with the above-described part of the corresponding side surface 3$c$. The side surface 3$c$ is covered with the film portion EIc at the above-described part and is exposed from the film portion EIc at the remaining part excluding the above-described part. In the side surface 3$c$, the above-described part is located closer to the main surface 3$a$ than the remaining part.

Each film portion EIe is disposed on a corresponding end surface 3$e$ of the pair of end surfaces 3$e$. Each film portion EIe is disposed on a part of the corresponding end surface 3$e$. Each film portion EIe covers the above-described part of the corresponding end surface 3$e$ and is in direct contact with the above-described part of the corresponding end surface 3$e$. The end surface 3$e$ is covered with the film portion EIe at the above-described part and is exposed from the film portion EIe at the remaining part excluding the above-described part. In the end surface 3$e$, the above-described part is located closer to the main surface 3$a$ than the remaining part.

The electrical insulating film EI includes a plurality of film portions disposed on the ridges 3$g$, 3$i$, and 3$j$, respectively. The film portion EIa and the film portion EIc are coupled by the film portion on the ridge portion 3$j$. The film portion EIa and the film portion EIe are coupled by the film portion on the ridge portion 3$g$. The film portion EIc and the film portion EIe are coupled by the film portion on the ridge portion 3*i*. For example, the electrical insulating film EI covers only a part of the element body 3. The main surface 3*b* is exposed from the electrical insulating film EI.

A height H1 of the electric insulating film EI in the second direction D2 from a reference plane PL is larger than a height H2 of the second electrode layer E2 in the second direction D2 from the reference plane PL. The height H1 includes, for example, the height of the film portion EIc in the second direction D2 from the reference plane PL. The height H2 includes, for example, the height of the second electrode layer E2 included in the electrode portion 5*c* in the second direction D2 from the reference plane PL. The reference plane PL includes the main surface 3*a*.

The internal electrode 7A opposes the second electrode layer E2 included in the electrode portion 5*c* that is electrically connected to the internal electrode 9 in the third direction D3. When the internal electrode 7A and the second electrode layer E2 included in the electrode portion 5*c* that is electrically connected to the internal electrode 9 are viewed from in the third direction D3, the internal electrode 7A and the second electrode layer E2 included in the electrode portion 5*c* that is electrically connected to the internal electrode 9 overlap each other. Therefore, an electric field tends to be generated between the internal electrode 7A and the second electrode layer E2 included in the electrode portion 5*c* that is electrically connected to the internal electrode 9.

The film portion EIc is located between the internal electrode 7A and the second electrode layer E2 included in the electrode portion 5*c* that is electrically connected to the internal electrode 9. The internal electrode 7A and the second electrode layer E2 included in the electrode portion 5*c* that is electrically connected to the internal electrode 9 oppose each other in a state in which the film portion EIc is present between the internal electrode 7A and the second electrode layer E2 included in the electrode portion 5*c* that is electrically connected to the internal electrode 9. The internal electrode 7A and the second electrode layer E2 included in the electrode portion 5*c* that is electrically connected to the internal electrode 9 indirectly oppose each other.

The internal electrode 9A opposes the second electrode layer E2 included in the electrode portion 5*c* that is electrically connected to the internal electrode 7 in the third direction D3. When the internal electrode 9A and the second electrode layer E2 included in the electrode portion 5*c* that is electrically connected to the internal electrode 7 are viewed from in the third direction D3, the internal electrode 9A and the second electrode layer E2 included in the electrode portion 5*c* that is electrically connected to the internal electrode 7 overlap each other. Therefore, an electric field tends to be generated between the internal electrode 9A and the second electrode layer E2 included in the electrode portion 5*c* that is electrically connected to the internal electrode 7.

The film portion EIc is located between the internal electrode 9A and the second electrode layer E2 included in the electrode portion 5*c* that is electrically connected to the internal electrode 7. The internal electrode 9A and the second electrode layer E2 included in the electrode portion 5*c* that is electrically connected to the internal electrode 7 oppose each other in a state in which the film portion EIc is present between the internal electrode 9A and the second electrode layer E2 included in the electrode portion 5*c* that is electrically connected to the internal electrode 7. The internal electrode 9A and the second electrode layer E2 included in the electrode portion 5*c* that is electrically connected to the internal electrode 7 indirectly oppose each other.

As described above, the end surface 3*e* is exposed from the film portion EIe at the remaining part. The one end of each of the plurality of internal electrodes 7 and 9 is exposed from the film portion EIe at the remaining part of the corresponding end surface 3*e*. Therefore, the plurality of internal electrodes 7 and 9 are directly connected to the corresponding external electrode 5 (electrode portion 5*e*).

As described above, the end surface 3*e* is covered with the film portion EIe at the above-described part. However, the one end of each of the plurality of internal electrodes 7 and 9 can be directly connected to the corresponding external electrode 5 (electrode portion 5*e*) even at the above-described part of the corresponding end surface 3*e*.

The electrical insulating film EI (film portion EIe) is not always uniformly formed with a predetermined film thickness. The material component constituting the electrical insulating film EI, for example, silicon oxide, is not densely attached to the outer surface of the element body 3 but sparsely attached thereto. Therefore, the first electrode layer E1 can be partially directly connected to the corresponding internal electrodes 7 and 9.

When the conductive paste for forming the second electrode layer E1 is heated, the material component constituting the electrical insulating film EI diffuses into the conductive paste, so that the material component constituting the electrical insulating film EI and the conductive paste are mixed. Therefore, even when the material component constituting the electrical insulating film EI is densely attached to the outer surface of the element body 3, the first electrode layer E1 can be partially directly connected to the corresponding internal electrodes 7 and 9.

In the multilayer capacitor C2, similarly to the multilayer capacitor C1, the film portion EIa included in the electrical insulating film EI is located at least on the region included in the main surface 3*a*, the region being between the plurality of external electrodes 5. Therefore, the multilayer capacitor C2 reduces occurrence of migration.

In the multilayer capacitor C2, the one end of each of the plurality of internal electrodes 7 and 9 is exposed from the electrical insulating film EI (film portion EIe) at the corresponding end surface 3*e*. Therefore, the electrical insulating film EI on the element body 3 tends not to impede the connection between the internal electrodes 7 and 9 and the external electrodes 5. Consequently, the multilayer capacitor C2 reduces deterioration of connectivity between the internal electrodes 7 and 9 and the external electrodes 5.

In the multilayer capacitor C2, the film portion EIc included in the electrical insulating film EI is located on the region included in the side surface 3*c*, the region being between the plurality of external electrodes 5. The metal tends not to deposit not only on the main surface 3*a* but also on side surface 3*c*. Consequently, the multilayer capacitor C2 further reduces the occurrence of the migration.

In the multilayer capacitor C2, the internal electrode 7A and the second electrode layer E2 included in the electrode portion 5*c* that is electrically connected to the internal electrode 9 indirectly oppose each other with the film portion EIc interposed therebetween.

In the multilayer capacitor C2, the film portion EIc reliably prevents the metal ion generated from the metal particle included in the second electrode layer E2 of the electrode portion 5*c* that is electrically connected to the internal electrode 9 on the side surface from reacting with the electron supplied from the internal conductor or the external electrode 5. Therefore, the multilayer capacitor C2 reliably reduces the occurrence of the migration.

The film portion EIc is located between the internal electrode 7A and the second electrode layer E2 included in the electrode portion 5*c* that is electrically connected to the internal electrode 9. Therefore, even when the external electrode 5 to which the internal electrode 9 is electrically connected has, for example, a positive polarity, electrons are reliably prevented from being supplied from the internal electrode 7A to metal ions. Consequently, the multilayer capacitor C2 further reduces the occurrence of the migration.

The film portion EIc is located between the internal electrode 9A and the second electrode layer E2 included in the electrode portion 5*c* that is electrically connected to the internal electrode 7. Therefore, even when the external electrode 5 to which the internal electrode 7 is electrically connected has, for example, a positive polarity, electrons are reliably prevented from being supplied from the internal electrode 9A to metal ions. Consequently, the multilayer capacitor C2 further reduces the occurrence of the migration.

In the multilayer capacitor C2, the height H1 of the electrical insulating film EI in the second direction D2 is larger than the height H2 of the second electrode layer E2 in the second direction D2. Therefore, the multilayer capacitor C2 reliably reduces the occurrence of the migration.

Next, a configuration of a multilayer capacitor C2 according to a modified example of the second example will be described with reference to FIGS. 15 to 18. FIGS. 15 to 18 are views illustrating a cross-sectional configuration of a multilayer capacitor according to the modified example of the second example.

The multilayer capacitor C2 according to the present modified example is generally similar to or the same as the multilayer capacitor C2 according to the second example described above. However, the present modified example is different from the above-described second example in a configuration of the internal electrodes 7 and 9. Hereinafter, differences between the above-described second example and the present modified example will be mainly described.

The internal electrodes 7 and the internal electrodes 9 are disposed in different positions (layers) in the second direction D2. The internal electrodes 7 and the internal electrodes 9 are alternately disposed in the element body 3 to oppose each other in the second direction D2 with an interval therebetween.

The plurality of internal electrodes 7 and the plurality of internal electrodes 9 are alternately disposed in the second direction D2. The plurality of internal electrodes 7 and the plurality of internal electrodes 9 are disposed in the element body 3 to be distributed in the second direction D2. Each of the plurality of internal electrodes 7 and the plurality of internal electrodes 9 is located in a plane substantially parallel to the main surfaces 3*a* and 3*b*. The internal electrode 7 and the internal electrode 9 oppose each other in the second direction D2. The direction in which the internal electrode 7 and the internal electrode 9 oppose each other, that is, the second direction D2 is orthogonal to a direction parallel to the main surfaces 3*a* and 3*b* (first direction D1 and third direction D3).

Figure 16:
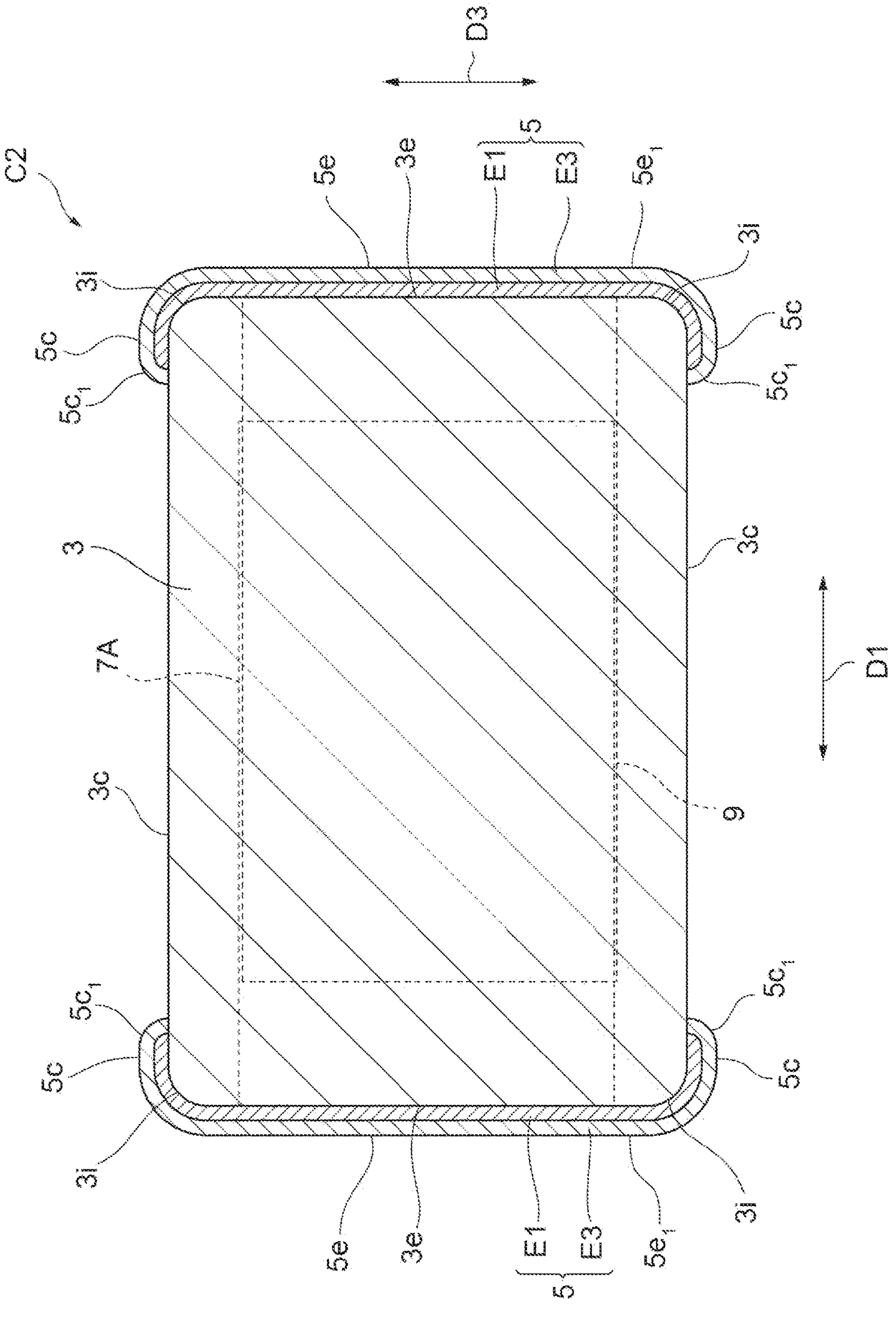
FIG. 16 is a view illustrating a cross-sectional configuration of the multilayer capacitor according to the modified example of the second example.
Figure 17:
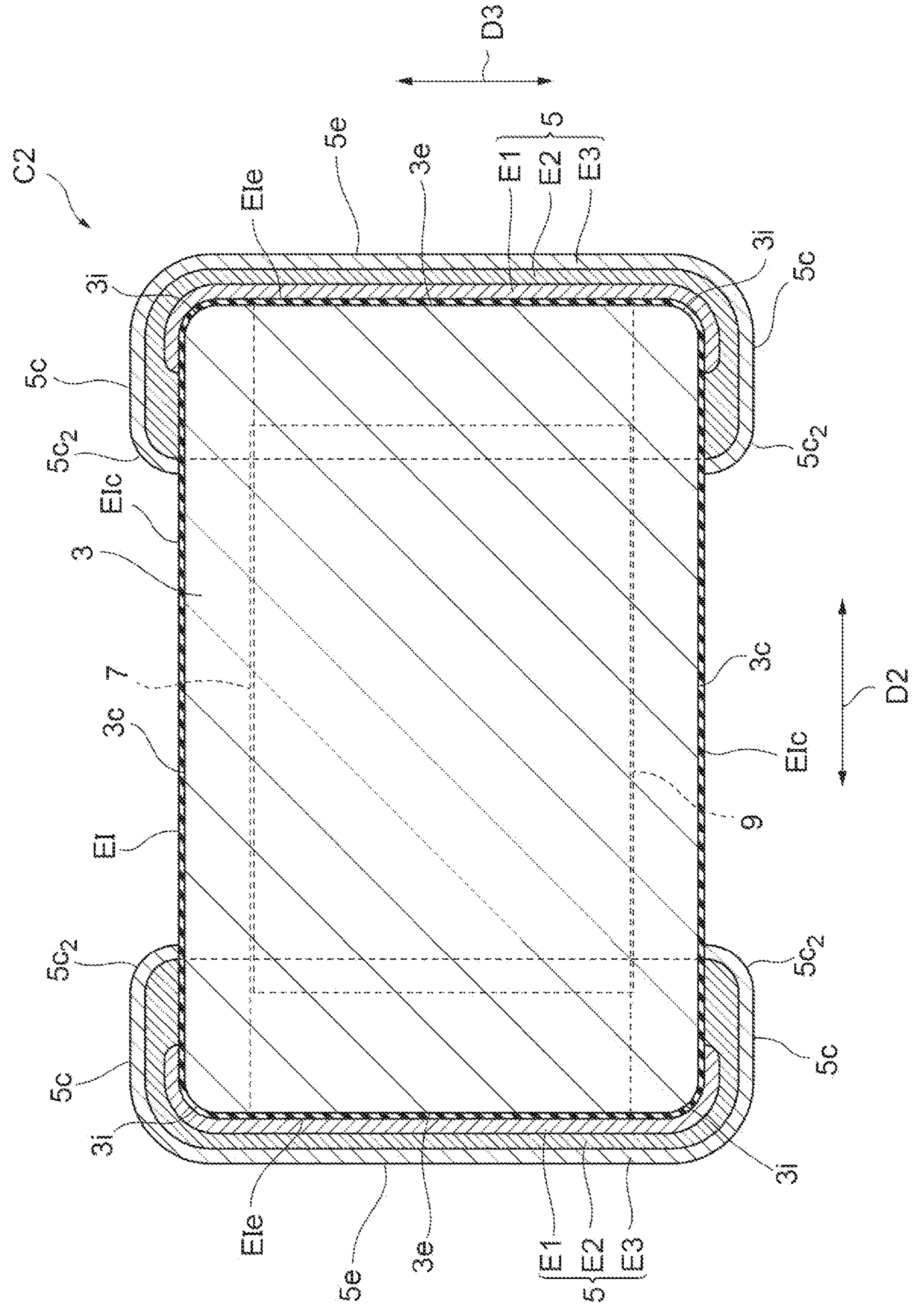
FIG. 17 is a view illustrating a cross-sectional configuration of the multilayer capacitor according to the modified example of the second example.
Figure 18:
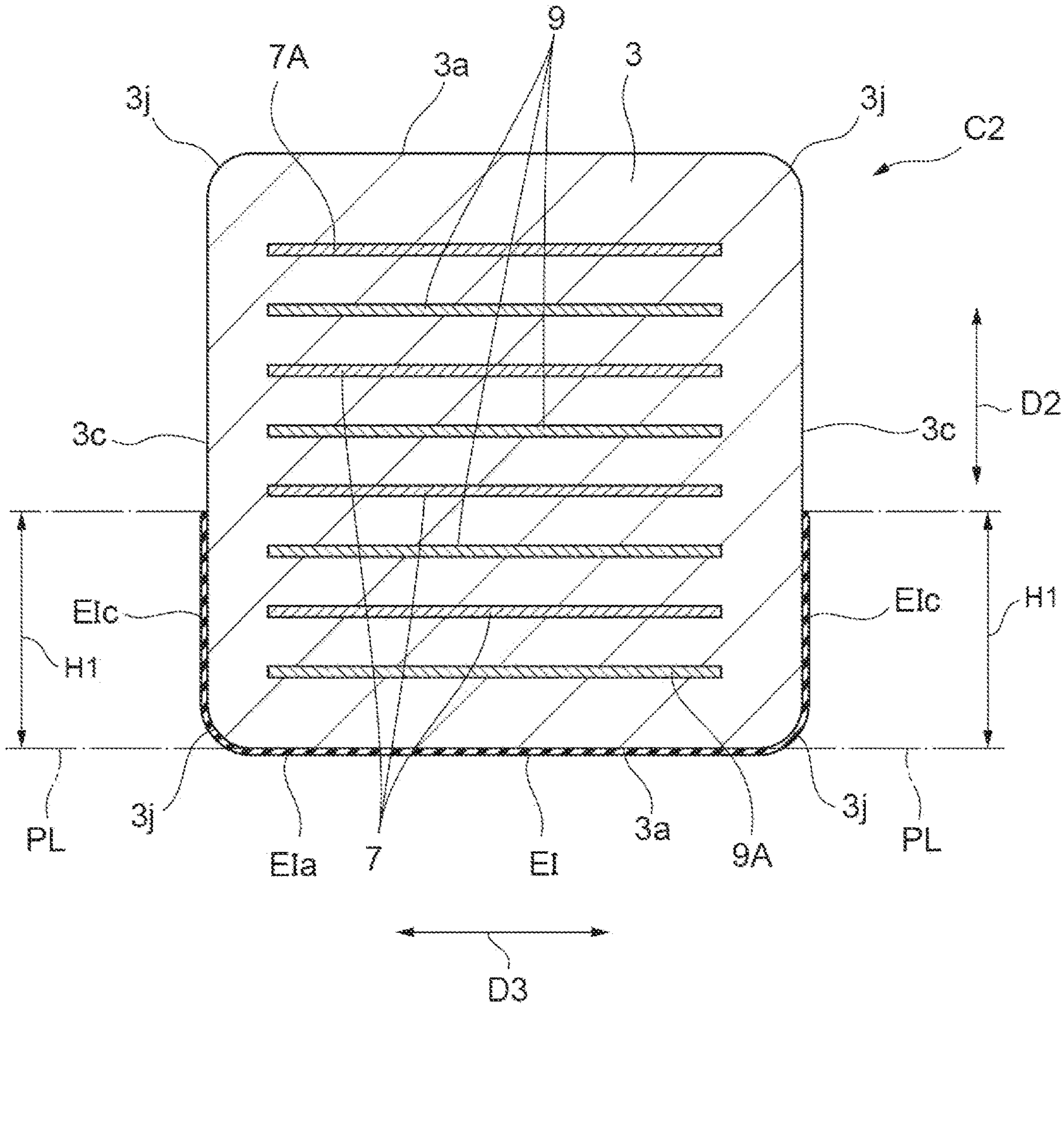
FIG. 18 is a view illustrating a cross-sectional configuration of the multilayer capacitor according to the modified example of the second example.

In the multilayer capacitor C2, the plurality of internal conductors does not include the conductors 11 and 13. In FIGS. 16 and 17, for the sake of explanation, the internal electrodes 7 and 9 are intentionally illustrated so as to deviate from each other in the third direction D3.

As described above, the end surface 3*e* is exposed from the film portion EIe at the remaining part. The plurality of internal electrodes 7 includes the internal electrode 7 whose the one end exposed to the remaining part of the corresponding end surface 3*e* and the plurality of internal electrodes 9 includes the internal electrode 9 whose the one end exposed to the remaining part of the corresponding end surface 3*e*. The internal electrode 7 including the one end exposed to the remaining part of the corresponding end surface 3*e* is directly connected to the corresponding external electrode 5 (electrode portion 5*e*) and the internal electrode 9 including the one end exposed to the remaining part of the corresponding end surface 3*e* is directly connected to the corresponding external electrode 5 (electrode portion 5*e*).

As described above, the end surface 3*e* is covered with the film portion EIe at the above-described part. The plurality of internal electrodes 7 can include the internal electrode 7 whose the one end exposed to the above-described part of the corresponding end surface 3*e* and the plurality of internal electrodes 9 can include the internal electrode 9 whose the one end exposed to the above-described part of the corresponding end surface 3*e*. Even in a configuration in which the plurality of internal electrodes 7 and 9 include the internal electrodes 7 and 9 each including the one end exposed to the above-described part of the corresponding end surface 3*e*, the internal electrodes 7 and 9 each including the one end exposed to the above-described part of the corresponding end surface 3*e* can be directly connected to the corresponding external electrode 5 (electrode portion 5*e*) as described above.

The multilayer capacitor C2 according to the present modified reduces occurrence of migration and reduces deterioration of connectivity between the internal electrodes 7 and 9 and the external electrodes 5 as described above.

In the present specification, in a case where an element is described as being disposed on another element, the element may be directly disposed on the other element or be indirectly disposed on the other element. In a case where an element is indirectly disposed on another element, an intervening element is present between the element and the other element. In a case where an element is directly disposed on another element, no intervening element is present between the element and the other element.

In the present specification, in a case where an element is described as being located on another element, the element may be directly located on the other element or be indirectly located on the other element. In a case where an element is indirectly located on another element, an intervening element is present between the element and the other element. In a case where an element is directly located on another element, no intervening element is present between the element and the other element.

In the present specification, in a case where an element is described as covering another element, the element may directly cover the other element or indirectly cover the other element. In a case where an element indirectly covers another element, an intervening element is present between the element and the other element. In a case where an element directly covers another element, no intervening element is present between the element and the other element.

It is to be understood that not all aspects, advantages and features described herein may necessarily be achieved by, or included in, any one particular example. Indeed, having described and illustrated various examples herein, it should be apparent that other examples may be modified in arrangement and detail.

The plurality of internal conductors included in the multilayer capacitor C1 are disposed in different positions (layers) in the third direction D3. However, the plurality of internal conductors included in the multilayer capacitor C1 may be disposed in different positions (layers) in the second direction D2.

The electronic component device may include the multilayer capacitor C2 instead of the multilayer capacitor C1.

In the present examples and modified examples, the electronic component includes the multilayer capacitor. However, applicable electronic component is not limited to the multilayer capacitor. The applicable electronic component includes, for example, a multilayer electronic component such as a multilayer inductor, a multilayer varistor, a multilayer piezoelectric actuator, a multilayer thermistor, a multilayer solid-state battery component, or a multilayer composite component, or electronic components other than the multilayer electronic components.

What is claimed is:

1. An electronic component, comprising:

an element body including a first main surface arranged to include a mounting surface, a second main surface opposing the first main surface, and a pair of end surfaces opposing each other and adjacent to the first and second main surfaces;

a plurality of internal conductors disposed in the element body and exposed to a corresponding end surface of the pair of end surfaces;

a plurality of external electrodes disposed on the element body and connected to a corresponding internal conductor of the plurality of internal conductors; and an electrical insulator on the element body, wherein the plurality of internal conductors are exposed from the electrical insulator at the corresponding end surface, each of the plurality of external electrodes includes a conductive resin layer and a sintered metal layer, the conductive resin layer covering at least a portion of the sintered metal layer, the electrical insulator includes an electrical insulating portion located at least on a region included in the first main surface, the region being between the plurality of external electrodes, the second main surface is exposed from the electrical insulator, the electrical insulator includes a portion covered with the sintered metal layer, and the electrical insulator includes a silicon oxide film.

2. The electronic component according to claim 1, wherein the element body further includes a side surface adjacent to the first main surface and the pair of end surfaces, and the electrical insulating portion is located on a ridge region included a ridge portion between the first main surface and the side surface, the ridge region being between the plurality of external electrodes.

3. The electronic component according to claim 1, wherein each of the plurality of internal conductors is disposed to extend in a direction intersecting the first main surface and includes an end exposed to the corresponding end surface, and the end each included in the plurality of internal conductors includes a region exposed from the electrical insulator.

4. The electronic component according to claim 1, wherein the element body further includes a side surface adjacent to first the main surface and the pair of end surfaces, and the electrical insulating portion is located on a side region included in the side surface, the side region being between the plurality of external electrodes.

5. The electronic component according to claim 1, wherein the element body further includes a side surface adjacent to the first main surface and the pair of end surfaces, the conductive resin layer includes a layer portion on the side surface, the plurality of internal conductors include an outermost internal conductor that is adjacent to the side surface and has a polarity different from that of the layer portion, and the layer portion and the outermost internal conductor indirectly oppose each other with the electrical insulating portion interposed therebetween.

6. The electronic component according to claim 1, wherein the element body further includes a side surface adjacent to the first main surface and the pair of end surfaces, the conductive resin layer includes a layer portion on the side surface, the plurality of internal conductors include a dummy conductor that is adjacent to the side surface and has a same polarity as that of the layer portion, and the layer portion and the dummy conductor oppose each other.

7. The electronic component according to claim 1, wherein the element body further includes a side surface adjacent to the first main surface and the pair of end surfaces, and the conductive resin layer continuously covers a part of the first main surface, a part of the corresponding end surface, and a part of the side surface.

8. The electronic component according to claim 1, wherein a height of the electrical insulator in a direction orthogonal to the first main surface is larger than a height of the conductive resin layer in the direction orthogonal to the first main surface.

9. The electronic component according to claim 1, wherein the electrical insulator includes only the electrical insulating portion, and the electrical insulating portion is located only on the first main surface.

10. The electronic component according to claim 1, wherein the electrical insulator is located between the element body and the conductive resin layer.

11. The electronic component according to claim 1, wherein the electrical insulator includes an electrical insulating thin film.

12. The electronic component according to claim 1, wherein the conductive resin layer includes a plurality of silver particles.

13. The electronic component according to claim 1, wherein the element body further includes a pair of side surfaces opposing each other and adjacent to the first main surface and the pair of end surfaces, and the conductive resin layer continuously covers only a part of the first main surface, only a part of the corresponding end surface, and only a part of each of the pair of side surfaces.

14. An electronic component, comprising:

an element body including a main surface arranged to include a mounting surface, and a pair of end surfaces opposing each other and adjacent to the main surface;

a plurality of internal conductors disposed in the element body and exposed to a corresponding end surface of the pair of end surfaces;

a plurality of external electrodes disposed on the element body and connected to a corresponding internal conductor of the plurality of internal conductors; and an electrical insulator on the element body, wherein the plurality of internal conductors are exposed from the electrical insulator at the corresponding end surface, each of the plurality of external electrodes includes a conductive resin layer, the electrical insulator includes an electrical insulating portion located at least on a region included in the main surface, the region being between the plurality of external electrodes, the entire electrical insulating portion is exposed from the conductive resin layer, the electrical insulator includes only the electrical insulating portion, and the electrical insulating portion is located only on the main surface.

15. The electronic component according to claim 14, wherein the element body further includes a side surface adjacent to the main surface and the pair of end surfaces, the conductive resin layer includes a layer portion on the side surface, the plurality of internal conductors include a dummy conductor that is adjacent to the side surface and has a same polarity as that of the layer portion, and the layer portion and the dummy conductor oppose each other.

16. The electronic component according to claim 14, wherein the element body further includes a side surface adjacent to the main surface and the pair of end surfaces, and the conductive resin layer continuously covers a part of the main surface, a part of the corresponding end surface, and a part of the side surface.

17. The electronic component according to claim 14, wherein the electrical insulator includes an electrical insulating thin film.

18. The electronic component according to claim 14, wherein the electrical insulator includes a silicon oxide film.

19. The electronic component according to claim 14, wherein the conductive resin layer includes a plurality of silver particles.

* * * * *